(12) United States Patent
Fornera et al.

(10) Patent No.: US 10,053,581 B2
(45) Date of Patent: Aug. 21, 2018

(54) PROCESS FOR THE PREPARATION OF CRUMBLES COMPRISING CALCIUM CARBONATE

(71) Applicant: Omya International AG, Oftringen (CH)

(72) Inventors: Tazio Fornera, Zofingen (CH); Ola Lindstrøm, Malmö (SE); Alain Cremaschi, Saint Germain la Ville (FR); Wolfgang Höpfl, Schwörstadt (DE); Rolf Endre Orten, Molde (NO)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/308,723

(22) PCT Filed: May 21, 2015

(86) PCT No.: PCT/EP2015/061229
§ 371 (c)(1),
(2) Date: Nov. 3, 2016

(87) PCT Pub. No.: WO2015/181037
PCT Pub. Date: Dec. 3, 2015

(65) Prior Publication Data
US 2017/0174895 A1    Jun. 22, 2017

Related U.S. Application Data

(60) Provisional application No. 62/018,772, filed on Jun. 30, 2014.

(30) Foreign Application Priority Data

May 26, 2014  (EP) .................................... 14169923

(51) Int. Cl.
| | |
|---|---|
| C01F 11/18 | (2006.01) |
| C09C 1/00 | (2006.01) |
| C09C 1/02 | (2006.01) |
| C09C 3/04 | (2006.01) |
| C09C 3/08 | (2006.01) |
| C08K 3/26 | (2006.01) |
| C08K 9/04 | (2006.01) |
| C08L 27/06 | (2006.01) |
| C09C 3/00 | (2006.01) |
| C08K 3/013 | (2018.01) |
| C08K 3/22 | (2006.01) |
| C08K 5/09 | (2006.01) |
| C08L 23/08 | (2006.01) |
| C08L 91/06 | (2006.01) |

(52) U.S. Cl.
CPC ............ *C09C 1/021* (2013.01); *C01F 11/185* (2013.01); *C08K 3/013* (2018.01); *C08K 3/22* (2013.01); *C08K 3/26* (2013.01); *C08K 5/09* (2013.01); *C08K 9/04* (2013.01); *C08L 23/0869* (2013.01); *C08L 27/06* (2013.01); *C08L 91/06* (2013.01); *C09C 3/006* (2013.01); *C09C 3/041* (2013.01); *C09C 3/043* (2013.01); *C09C 3/08* (2013.01); *C01P 2004/51* (2013.01); *C01P 2004/61* (2013.01); *C01P 2004/62* (2013.01); *C01P 2006/12* (2013.01); *C01P 2006/62* (2013.01); *C01P 2006/63* (2013.01); *C01P 2006/64* (2013.01); *C01P 2006/82* (2013.01); *C08K 2003/265* (2013.01); *C08K 2201/006* (2013.01)

(58) Field of Classification Search
CPC ................................ C09C 1/021; C01F 11/18
See application file for complete search history.

(56) References Cited

U.S. PATENT DOCUMENTS

| | | | |
|---|---|---|---|
| 4,725,318 A * | 2/1988 | Minayoshi | ........... D21H 17/675 |
| | | | 106/464 |
| 5,278,248 A | 1/1994 | Egraz et al. | |
| 5,533,678 A | 7/1996 | Strauch et al. | |
| 5,731,034 A | 3/1998 | Husband | |
| 8,002,887 B2 * | 8/2011 | Rainer | .................... C01F 11/18 |
| | | | 106/464 |

(Continued)

FOREIGN PATENT DOCUMENTS

| | | |
|---|---|---|
| EP | 0607840 A1 | 7/1994 |
| EP | 0850880 A1 | 7/1998 |

(Continued)

OTHER PUBLICATIONS

The International Search Report dated Aug. 24, 2015 for PCT/EP2015/061229.
The Written Opinion of International Searching Authority dated Aug. 24, 2015 for PCT/EP2015/061229.
Notice of Opposition to a European Patent dated Nov. 28, 2017 filed by Calcit d.o.o. for European Patent No. EP 2949707.
Affidavit made by Aleš Mujdrica dated Nov. 16, 2017 for European Patent No. EP 2949707.
Affidavit made by Mojca Opresnik dated Nov. 24, 2017 for European Patent No. EP 2949707.
Omya International AG catalogue, "Calcium Carbonate in the Paper Industry," Dec. 2004, 200 pages.
Labface Sancroft Way, "Particle Size Measurement with the SediGraph III 5120 from Micromeritics," https://labface.com/suppliers/particle-size-68, Oct. 19, 2011.

(Continued)

Primary Examiner — Rip A Lee
(74) Attorney, Agent, or Firm — Amster, Rothstein & Ebenstein LLP

(57) ABSTRACT

The present invention relates to crumbles comprising at least one calcium carbonate-containing material, a process for the preparation of the crumbles, an article comprising the crumbles as well as an use of the crumbles in paper making, paper coating, food, plastic, preferably films, more preferably blown films or breathable films, fibres, polyvinyl chloride, plastisols, thermosetting polymers, more preferably thermosetting unsaturated polyesters or thermosetting unsaturated polyurethanes, agricultural, paint, coatings, adhesives, sealants, pharmaceuticals, agricultural, construction and/or cosmetic applications.

29 Claims, 1 Drawing Sheet

(56) References Cited

U.S. PATENT DOCUMENTS

| | | | | |
|---|---|---|---|---|
| 8,517,291 | B2* | 8/2013 | Rainer | C01F 11/185 |
| | | | | 241/21 |
| 9,580,605 | B2* | 2/2017 | Wimmer | C09C 1/021 |
| 2010/0095869 | A1 | 4/2010 | Dupont et al. | |
| 2011/0269887 | A1* | 11/2011 | Gane | C09C 1/021 |
| | | | | 524/425 |
| 2011/0297043 | A1* | 12/2011 | Gane | C09C 3/041 |
| | | | | 106/286.6 |
| 2013/0174994 | A1 | 7/2013 | Buri et al. | |

FOREIGN PATENT DOCUMENTS

| | | | | |
|---|---|---|---|---|
| EP | 2194103 A1 | 6/2010 | | |
| EP | 2 524 898 A1 * | 11/2012 | | C01B 31/24 |
| EP | 2546410 A1 | 1/2013 | | |
| EP | 2379648 B1 | 6/2013 | | |
| GB | 2139606 A | 11/1984 | | |
| JP | S62263238 A | 11/1987 | | |
| JP | 2004008959 A | 1/2004 | | |
| WO | 2004016566 A1 | 2/2004 | | |
| WO | WO 2004/016566 A1 * | 2/2004 | | C04B 14/00 |
| WO | 2009009553 A1 | 1/2009 | | |
| WO | WO 2009/009553 A1 * | 1/2009 | | C09C 1/02 |
| WO | 2010070002 A1 | 6/2010 | | |
| WO | 2010098821 A2 | 9/2010 | | |
| WO | 2013030178 A1 | 3/2013 | | |
| WO | 2013061068 A1 | 5/2013 | | |
| WO | 2013167420 A1 | 11/2013 | | |
| WO | 2014001063 A1 | 1/2014 | | |
| WO | 2014044778 A1 | 3/2014 | | |

OTHER PUBLICATIONS

Internet Archive, "Particle Size Measurement with the SediGraph III 5120 from Micromeritics," https://web.archive.org/web/20111019055340/https://labface.com/suppliers/particle-size-68, Oct. 19, 2011.
"Methods of Moisture Content Determination, Halogen Moisture Analyzer from Mettler Toledo," Application Brochure, Feb. 2002.
"Operating Instructions—HR73 and HG53 Moisture Analyzers, HR73-P and HG53-P Moisture Analyzers," 2001.
Ahn, J.V. et al., "Comparison of Oven-Drying Methods for Determination of Moisture Content in Feed Ingredients," Asian Australas. J. Anim. Sci., vol. 27, No. 11, Nov. 2014, pp. 1615-1622.
Calcit d.o.o. catalogue disclosing calcium carbonate-containing products, Feb. 2010, 8 pages.
MatWeb, LLC, "Omya Hydrocarb® 90 HS Calcium Carbonate," http://www.matweb.com/search/datasheet.aspx?matguid=d61fcf42cbd04ebd87468a3ad02186ba, Nov. 3, 2012.
Internet Archive, "Omya Hydrocarb® 90 HS Calcium Carbonate," https://web.archive.org/web/20121103181904/http://matweb.com/search/GetMatIsByManufacturer.aspx?navletter=O&manID=579&manname=Omya+North+America, Nov. 3, 2012.
Metso Product Catalogue, "Tube Press—Mechanical Dewatering by Pressure," 2011, pp. 1-8.
Notice of Opposition to a European Patent dated Dec. 1, 2017 filed by Schaefer Kalk GmbH & Co. KG for European Patent No. EP 2949707.
Lückert, "Pigment + Füllstoff Tabellen," 6th Edition, Vincentz Verlag, Hannover, 2002, pp. 12-25, 730-733, 738-741, and 760-763.
Specialty Minerals, "Opacarb® A60—Performance Minerals for Paper," Technical Data, datasheet, 2003.
Schaefer Kalk, "Schaefer Precarb® 100," Technical Data Sheet, Apr. 2012.
Schaefer Kalk, "Schaefer Precarb® 110," Technical Data Sheet, Apr. 2012.
Schaefer Kalk, "Schaefer Precarb® 120," Technical Data Sheet, Apr. 2012.
Schaefer Kalk, "Schaefer Precarb® 400," Technical Data Sheet, Apr. 2012.
Müller et al., "Formulierung von Kleb- und Dichtstoffen—Coatings Compendien," Vincentz Network, Hannover, 2004, pp. 243-246 and 276-279.
Response to the Communication of Notices of Opposition filed in the European Patent Office by Omya International AG dated May 17, 2018 for European Patent No. EP 2949707.
Omya Product Information, "Hydrocarb® 60—GU 78%," Technical Data Sheet, Version 7, Edition Aug. 18, 2010.
Omya Product Information, "Hydrocarb® 60—OG 78%," Technical Data Sheet, Version 8, Edition Jul. 2, 2009.
Omya Product Information, "Hydrocarb® 60—ME 78%," Technical Data Sheet, Version 5, Edition Jan. 12, 2011.
Definitions of "slurry," https://www.wordnik.com/words/slurry, 1 page, May 23, 2018.
Definitions of "crumble," https://www.wordnik.com/words/crumble, 1 page, May 23, 2018.
Notice of Acceptance for Patent Application dated May 10, 2017 for Australian Application No. 2015266175.
Office Action dated Dec. 11, 2017 for Canadian Application No. 2,948,431.
Office Action dated Jan. 31, 2018 for Chilean Application No. 2016-3042.
Office Action dated Jun. 20, 2017 for Chinese Application No. 201580027549.2.
Office Action dated Apr. 5, 2017 for Colombian Application No. NC2016/0004262.
Search Report dated Nov. 20, 2014 for European Application No. 14169923.1.
Office Action dated Jan. 9, 2018 for Japanese Application No. 2016-569641.
Office Action dated Feb. 1, 2018 for Korean Application No. 10-2016-7036333.
Office Action dated Oct. 12, 2017 for Mexican Application No. MX/a/2016/015412.
Decision to Grant a Patent for Invention dated Jan. 12, 2018 for Russian Application No. 2016149095/05.
Search Report dated Jan. 12, 2018 for Russian Application No. 2016149095/05.
Examination Report dated Jul. 4, 2017 for Singapore Application No. 11201609606P.
Examination Report dated Jul. 5, 2016 for Taiwanese Application No. 104116020.

* cited by examiner

PROCESS FOR THE PREPARATION OF CRUMBLES COMPRISING CALCIUM CARBONATE

CROSS-REFERENCE TO RELATED APPLICATIONS

This is a U.S. national phase of PCT Application No. PCT/EP2015/061229, filed May 21, 2015, which claims priority to European Application No. 14169923.1, filed May 26, 2014 and U.S. Provisional Application No. 62/018,772, filed Jun. 30, 2014.

The present invention relates to crumbles comprising at least one calcium carbonate-containing material, a process for the preparation of the crumbles, an article comprising the crumbles as well as an use of the crumbles in paper making, paper coating, food, plastic, agricultural, paint, coatings, adhesives, sealants, pharmaceuticals, agricultural, construction and/or cosmetic applications.

In practice, filler materials and especially calcium carbonate-containing materials are often used as particulate fillers in a great variety of applications, such as in paper making, paper coating, food, plastic, agricultural, paint, coatings, adhesives, pharmaceuticals, agricultural, construction and cosmetic applications. Materials of this type are usually sold by the manufacturer in the form of aqueous slurries having a distinct water-insoluble solid content. However, such slurries have the disadvantage that, in order to keep the calcium carbonate-containing material in suspension, the addition of dispersants is required. Water-soluble polymers and copolymers which may be used as e.g. dispersant in such slurries are, for example, described in U.S. Pat. No. 5,278,248. However, dispersants may interfere with some optical properties such as opacity, light scattering and brightness when incorporated in the ultimate product, e.g. paper coatings, and thus the demand for dispersant-free slurries of calcium carbonate-containing materials is increasing. Furthermore, the aforementioned slurries are often subject to contamination by microorganisms such as aerobic and anaerobic bacteria resulting in changes in the slurry characteristics such as changes in viscosity and/or pH, discolorations, unpleasant odour or reductions in other quality parameters, which negatively affect their commercial value. Therefore, the manufacturers of such slurries usually take measures for stabilizing the slurries in that biocides are added into such slurries, which may, however, interfere with optical and/or mechanical properties or legal requirements of the ultimate product. Furthermore, slurries are of a relatively high volume and weight and thus less total amount of a calcium carbonate-containing material in form of slurry is transported to a costumer's place by the same loading compared to a powder.

In order to avoid the addition of dispersants and/or biocides into the slurries, said calcium carbonate-containing materials are alternatively sold by the manufacturer in the form of a powder. However, these dry powders have the disadvantage that they have a low bulk density and flow properties at high dusting, which make them difficult to handle due to the need of special equipment dealing with the flow and dusting characteristics of the powder and its higher storage capacity.

In the past, efforts have been made to increase the bulk density of such powders using energy consuming compaction equipment, such as bricketting machines or pelletizers. However, these have proved to be unacceptable for several reasons. When the bulk density of such powders is increased mechanically by pressure, the flow properties of such powders are usually getting worse. Higher energy input is needed to load the product into a tank or container or to empty such a tank or container. Further, pelletizing equipment, which relies upon water as a binder, has been found to require the addition of large quantities of water (roughly 15 to 25 wt.-% of the weight of the calcium carbonate) before acceptable pellets can be formed. This water either increases the shipping costs of the product or increases production costs because it must be evaporated prior to shipment. Pelletizing equipment relying upon binders other than water also requires large amounts of binder and is found to result in a pelletized product which is difficult to make-down in water after pelletization and drying.

Furthermore, calcium carbonate-containing materials are generally prepared by dry grinding or wet grinding and subsequent drying. For example, WO 2010/098821 A2 refers to mineral pigments (such as kaolin clay) having a high surface area and particle size in the nano scale range. These pigments are manufactured by intensive wet milling of a mineral composition which may have undergone prior dry grinding and then optionally subjecting the wet milled mineral composition to an acid treatment. WO 2013/061068 A1 refers to particulate fillers which possess no, or very low, amounts of coarse material, compositions comprising said fillers and uses thereof. The method of removing coarse particles from a particulate material comprises: dry sieving or sifting the particulate material to produce the particulate filler.

However, in order to obtain a fine calcium carbonate-containing material, the energy input, especially during dry grinding, is relatively high. In addition thereto, the parameters in wet and dry grinding processes are not that adjustable that a defined ground material having a controlled particle size distribution, BET surface area and top cut can be obtained. Thus, the material obtained is usually subjected to further steps after grinding in order to remove certain impurities such as ionic and/or chemical components or to remove certain particle fractions for obtaining a material meeting the desired needs. Furthermore, the moisture pick-up susceptibility of such materials is relatively high, especially when prepared in the presence of dispersants which again may interfere with optical and/or mechanical properties of the ultimate product.

Therefore, there is a continuous need in the art for a calcium carbonate-containing material which avoids the disadvantages of slurries, namely the incorporation of dispersants and/or biocides. Furthermore, there is a need in the art for a calcium carbonate-containing material which offers the advantages of a powder as regards the transportation but avoids its disadvantages, namely the low bulk density and flow at high dusting of powders. In particular, it is desirable to prepare a calcium carbonate-containing material having controlled particle size distribution, BET surface area, top cut and moisture pick-up susceptibility at low energy input and which can be used as dry product or which can be easily made into a slurry at the costumers site depending on the costumers needs.

Accordingly, it is an object of the present invention to provide a calcium carbonate-containing material that significantly reduces the disadvantages of the prior art. A further objective is to provide a calcium carbonate-containing material being free of biocides and/or dispersants. Another objective of the present invention is to provide a calcium carbonate-containing material having high bulk density and flow properties at low dusting. A further objective of the present invention is to provide a calcium carbonate-containing material of which more tons per loading can be transported compared to a slurry comprising the same amount of calcium carbonate-containing material. An even further objective of the present invention is to provide a calcium carbonate-containing material having a controlled particle size distribution, BET surface area and top cut that can be easily prepared with low energy input. A still further objective of the present invention is to provide a calcium carbonate-containing material having a low moisture pick-up. Another objective of the present invention is to provide a calcium carbonate-containing material which can be used as a dry product or which can be easily made into a slurry.

The foregoing and other objectives are solved by the subject-matter as defined herein in claim 1.

DETAILED DESCRIPTION

Figure 1:
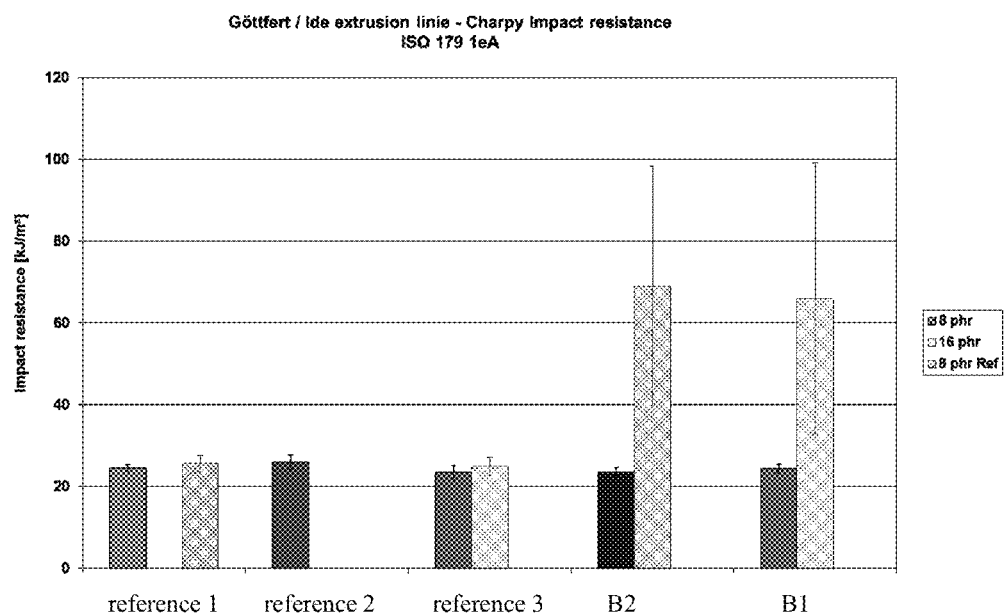
FIG. 1: Plot showing prepared extruded profiles tested with regard to charpy impact resistance (ISO 179/1fC).

According to one aspect of the present application crumbles comprising at least one calcium carbonate-containing material are provided. The crumbles
  a) having solids content of 78.0 wt.-% to 90.0 wt.-%, based on the total weight of the crumbles,
  b) comprising particles of the at least one calcium carbonate-containing material having a
    i) weight particle size $d_{75}$ of 0.7 to 3.0 µm,
    ii) weight median particle size $d_{50}$ of 0.5 to 2.0 µm,
    iii) weight particle size $d_{25}$ of 0.1 to 1.0 µm, as measured according to the sedimentation method, and
  c) comprising particles of the at least one calcium carbonate-containing material having a BET specific surface area of from 4.0 to 12.0 m$^2$/g, measured by nitrogen gas adsorption using the BET isotherm (ISO 9277:2010).

The inventors surprisingly found out that the foregoing crumbles according to the present invention can be easily prepared at low energy input with satisfactorily high bulk density and flow properties at low dusting. In addition thereto, more tons per loading of the foregoing crumbles can transported compared to a slurry comprising the same amount of the calcium carbonate-containing material. Furthermore, the foregoing crumbles according to the present invention have controlled particle size distribution, BET surface area and top cut, have low moisture pick-up susceptibility and are free of biocides and/or dispersants. In addition thereto, the foregoing crumbles can be used as a dry product or can be easily made into a slurry. More precisely, the inventors found that the mechanical and optical properties as well as the handling of a calcium carbonate-containing material can be improved by a material having specific solids content and particle size distribution as defined herein.

According to another aspect of the present invention, a process for the preparation of crumbles comprising at least one calcium carbonate-containing material as defined herein is provided. The process comprising the steps of:
  a) providing at least one calcium carbonate-containing material in the form of an aqueous slurry having solids content in the range from 5.0 to 45.0 wt.-%, based on the total weight of the slurry,
  b) wet grinding the at least one calcium carbonate-containing material of step a) to obtain an aqueous slurry of the at least one wet-ground calcium carbonate-containing material, wherein the particles of the at least one wet-ground calcium carbonate-containing material have a
    i) weight particle size $d_{75}$ of 0.7 to 3.0 µm,
    ii) weight median particle size $d_{50}$ of 0.5 to 2.0 µm,
    iii) weight particle size $d_{25}$ of 0.1 to 1.0 µm, as measured according to the sedimentation method, and
    iv) a BET specific surface area of from 4.0 to 12.0 m$^2$/g, measured by nitrogen gas adsorption using the BET isotherm (ISO 9277:2010),
  c) mechanical dewatering of the aqueous slurry of step b) to obtain crumbles comprising the at least one calcium carbonate-containing material having solids content of 78.0 wt.-% to 90.0 wt.-%, based on the total weight of the crumbles.

It is preferred that the aqueous slurry of the at least one calcium carbonate-containing material of step a) is free of dispersing agents and/or wet-grinding step b) and/or mechanical dewatering step c) is/are carried out in the absence of dispersing agents. It is further preferred that the aqueous slurry of the at least one wet-ground calcium carbonate-containing material obtained in step b) has a) lower solids content than the aqueous slurry of the at least one calcium carbonate-containing material provided in step a), and/or b) solids content in the range from 10.0 to 35.0 wt.-%, based on the total weight of the slurry. It is even further preferred that process step b) is carried out in the presence of at least one further particulate filler material, preferably at least one further particulate filler material selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof. It is still further preferred that the aqueous slurry of the at least one wet-ground calcium carbonate-containing material obtained in step b) is partially dewatered to solids content in the range from 20.0 to 40.0 wt.-%, based on the total weight of the slurry, before process step c) is carried out. It is also preferred that process step c) is carried out under pressure, preferably a pressure from 20.0 bar to 140.0 bar, more preferably from 65.0 bar to 120.0 bar and most preferably from 80.0 to 110.0 bar. It is further preferred that process step c) is carried out in a vertical plate pressure filter, a tube press or a vacuum filter, preferably in a tube press. It is still further preferred that the process further comprises step d) of a) treating the crumbles comprising the at least one calcium carbonate-containing material obtained in step c) with a hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric acid di-ester, to obtain surface-treated crumbles comprising on at least a part of the accessible surface area of the calcium carbonate-containing material particles a treatment layer comprising the hydrophobizing agent, and/or b) drying the crumbles comprising the at least one calcium carbonate-containing material obtained in step c) to solids content of ≥97.0 wt.-%, preferably from 97.0 to 99.98 wt.-% and most preferably from 97.0 to 99.98 wt.-%, based on the total weight of the crumbles, and/or c) dispersing the crumbles by using a polyacrylate-based dispersant.

According to an even further aspect of the present invention, an article comprising the crumbles comprising at least one calcium carbonate-containing material is provided. According to one embodiment, the article is selected from the group comprising plastic, preferably films, more preferably blown films or breathable films, fibres, polyvinyl chloride, plastisols, thermosetting polymers, more preferably thermosetting unsaturated polyesters or thermosetting unsaturated polyurethanes, food, cosmetic, sealant, pharmaceutical, paper, paper coating, coating, paint, adhesive articles and mixtures thereof.

According to still another aspect of the present invention, an use of crumbles comprising at least one calcium carbonate-containing material in paper making, paper coating, food, plastic, preferably films, more preferably blown films or breathable films, fibres, polyvinyl chloride, plastisols, thermosetting polymers, more preferably thermosetting unsaturated polyesters or thermosetting unsaturated polyurethanes, agricultural, paint, coating, adhesive, sealant, pharmaceutical, agricultural, construction and/or cosmetic applications, is provided.

Advantageous embodiments of the inventive crumbles are defined in the corresponding sub-claims.

According to one embodiment the at least one calcium carbonate-containing material is at least one natural calcium carbonate-containing material, preferably dolomite and/or at least one ground calcium carbonate (GCC), more preferably at least one ground calcium carbonate (GCC) and most preferably at least one ground calcium carbonate (GCC) selected from the group comprising marble, chalk, limestone and mixtures thereof.

According to another embodiment the crumbles comprise a) at least one further particulate filler material, preferably at least one further particulate filler material selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof, and/or b) on at least a part of the accessible surface area of the calcium carbonate-containing material particles a treatment layer comprising a hydrophobizing agent, preferably an aliphatic carboxylic acid having a total amount of carbon atoms from C4 to C24 and/or reaction products thereof and/or at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof and/or a phosphoric acid ester blend of one or more phosphoric acid mono-ester and/or reaction products thereof and one or more phosphoric acid di-ester and/or reaction products thereof.

According to yet another embodiment the crumbles have a) a moisture pick up susceptibility such that its total surface moisture level is ≤0.6 mg/g, preferably ≤0.5 mg/g, more preferably ≤0.4 mg/g and most preferably ≤0.3 mg/g of the dry crumbles after exposure to an atmosphere of 50% of relative humidity for 48 hours at a temperature of 23° C., and/or b) a moisture content of from 0.2 wt.-% to 0.6 wt.-%, preferably from 0.2 wt.-% to 0.4 wt.-% and most preferably from 0.25 wt.-% to 0.35 wt.-%, based on the total dry weight of the crumbles.

It should be understood that for the purpose of the present invention, the following terms have the following meaning.

For the purpose of the present invention, the term "crumbles" comprising at least one calcium carbonate-containing material refers to a material being composed of a plurality of particles comprising the at least one calcium carbonate-containing material and moisture such that the crumbles have solids content of 78.0 wt.-% to 90.0 wt.-%, based on the total weight of the crumbles.

The term "calcium carbonate-containing material" refers to a material that comprises at least 50.0 wt.-% calcium carbonate, based on the total dry weight of the calcium carbonate-containing material.

Throughout the present document, the "particle size" of a particulate material is described by its distribution of particle sizes. The value $d_x$ represents the diameter relative to which x % by weight of the particles have diameters less than $d_x$. This means that the $d_{25}$ value is the particle size at which 25.0 wt.-% of all particles are smaller, and the $d_{75}$ value is the particle size at which 75.0 wt.-% of all particles are smaller. The $d_{50}$ value is thus the weight median particle size, i.e. 50.0 wt.-% of all particle grains are bigger or smaller than this particle size. For the purpose of the present invention the particle size is specified as weight median particle size $d_{50}$ unless indicated otherwise. For determining the weight median particle size $d_{50}$ value, a Sedigraph™ 5120 or a Sedigraph™ 5100 device from the company Micromeritics Instrument Corporation, USA can be used.

A "specific surface area" (SSA) of a particulate material in the meaning of the present invention is defined as the surface area of the particulate material divided by the mass of the particulate material. As used herein, the specific surface area is measured by adsorption using the BET isotherm (ISO 9277:2010), and is specified in $m^2/g$.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This means that, unless the context clearly dictates otherwise, the term "obtained" does not mean to indicate that an embodiment must be obtained by, e.g. the sequence of steps following the term "obtained" even though such a limited understanding is always included by the terms "obtained" or "defined" as a preferred embodiment.

In the following, the details and preferred embodiments of the inventive crumbles will be described in more detail. It is to be understood that these technical details and embodiments also apply to the inventive process for the preparation of the crumbles, the inventive article and its use.

Crumbles Comprising at Least One Calcium Carbonate-containing Material

According to the instant invention, the crumbles comprise at least one calcium carbonate-containing material.

The term "at least one" calcium carbonate-containing material in the meaning of the present invention means that the calcium carbonate-containing material comprises, preferably consists of, one or more calcium carbonate-containing material.

In one embodiment of the present invention, the at least one calcium carbonate-containing material comprises, preferably consists of, one calcium carbonate-containing material. Alternatively, the at least one calcium carbonate-containing material comprises, preferably consists of, two or more calcium carbonate-containing materials. For example, the at least one calcium carbonate-containing material comprises, preferably consists of, two or three calcium carbonate-containing materials.

Preferably, the at least one calcium carbonate-containing material comprises, more preferably consists of, one calcium carbonate-containing material.

According to one embodiment of the present invention, the at least one calcium carbonate-containing material is at least one natural calcium carbonate-containing material.

The term "natural" calcium carbonate-containing material in the meaning of the present invention refers to a calcium carbonate-containing material obtained from natural sources, such as limestone, marble, chalk and/or dolomite, and processed through a wet and/or dry treatment such as grinding, screening and/or fractionation, for example by a cyclone or classifier.

According to one embodiment of the present invention, the at least one calcium carbonate-containing material, preferably the at least one natural calcium carbonate-containing material, is dolomite and/or at least one ground calcium carbonate (GCC). More preferably, the at least one calcium carbonate-containing material, preferably the at least one natural calcium carbonate-containing material, is at least one ground calcium carbonate (GCC).

"Dolomite" in the meaning of the present invention is a carbonatic calcium-magnesium-mineral having the chemical composition of $CaMg(CO_3)_2$ ("$CaCO_3 \cdot MgCO_3$"). Dolomite mineral contains at least 30.0 wt.-% $MgCO_3$, based on the total weight of dolomite, preferably more than 35.0 wt.-%, more preferably more than 40.0 wt.-% $MgCO_3$.

"Ground calcium carbonate" (GCC) in the meaning of the present invention is a calcium carbonate obtained from natural sources, such as limestone, marble, chalk or mixtures thereof.

It is appreciated that the crumbles comprising the at least one calcium carbonate-containing material are obtainable by the process for the preparation of crumbles as described further below.

For example, the GCC is selected from the group comprising marble, chalk, limestone and mixtures thereof. In one embodiment, the GCC is marble or chalk, preferably marble.

According to one embodiment of the present invention, the at least one calcium carbonate-containing material comprises, preferably consists of, particles consisting of calcium carbonate in an amount of ≥50.0 wt.-%, preferably of 90.0 wt.-%, more preferably of ≥95.0 wt.-% and most preferably of ≥97.0 wt.-%, based on the total dry weight of the at least one at least one calcium carbonate-containing material.

The term "dry" with regard to the at least one calcium carbonate-containing material is understood to be a material having less than 0.3% by weight of water relative to the weight of the at least one calcium carbonate-containing material. The % water is determined according to the Coulometric Karl Fischer measurement method, wherein the at least one natural source of calcium carbonate is heated to 220° C., and the water content released as vapour and isolated using a stream of nitrogen gas (at 100 ml/min) is determined in a Coulometric Karl Fischer unit.

The at least one calcium carbonate-containing material preferably comprises, more preferably consists of, particles having a weight median particle size $d_{50}$ of 0.5 to 2.0 µm, as measured by the sedimentation method.

In one embodiment of the present invention, the at least one calcium carbonate-containing material comprises, preferably consists of, particles having a weight median particle size $d_{50}$ preferably from 0.5 to 1.9 µm, more preferably from 0.6 to 1.8 µm, and most preferably from 0.7 to 1.8 µm, as measured by the sedimentation method.

Additionally, the at least one calcium carbonate-containing material comprises, preferably consists of, particles having a weight particle size $d_{75}$ from 0.7 to 3.0 µm, as measured by the sedimentation method. In one embodiment of the present invention, the at least one calcium carbonate-containing material comprises, preferably consists of, particles having a weight particle size $d_{75}$ from 0.7 to 2.9 µm, and most preferably from 0.7 to 2.8 µm, as measured by the sedimentation method.

Additionally, the at least one calcium carbonate-containing material comprises, preferably consists of, particles having a weight particle size $d_{25}$ from 0.1 to 1.0 µm, as measured by the sedimentation method. In one embodiment of the present invention, the at least one calcium carbonate-containing material comprises, preferably consists of, particles having a weight particle size $d_{25}$ from 0.1 to 0.9 µm, and most preferably from 0.15 to 0.8 µm, as measured by the sedimentation method.

It is thus one requirement of the instant invention that the particles of the at least one calcium carbonate-containing material in the crumbles have a i) weight particle size $d_{75}$ of 0.7 to 3.0 µm, ii) weight median particle size $d_{50}$ of 0.5 to 2.0 µm and iii) weight particle size $d_{25}$ of 0.1 to 1.0 µm, as measured according to the sedimentation method.

Preferably, the particles of the at least one calcium carbonate-containing material have a i) weight particle size $d_{75}$ of 0.7 to 2.9 µm, ii) weight median particle size $d_{50}$ of 0.5 to 1.9 µm and iii) weight particle size $d_{25}$ of 0.1 to 0.9 µm, as measured according to the sedimentation method. More preferably, the particles of the at least one calcium carbonate-containing material have a i) weight particle size $d_{75}$ of 0.7 to 2.8 µm, ii) weight median particle size $d_{50}$ of 0.6 to 1.8 µm and iii) weight particle size $d_{25}$ of 0.15 to 0.8 µm, as measured according to the sedimentation method.

Additionally or alternatively, the at least one calcium carbonate-containing material comprises, preferably consists of, particles of which at least 30.0 wt.-%, preferably at least 50.0 wt.-%, more preferably at least 58.0 wt.-% and most preferably from 58.0 to 95.0 wt.-%, have a weight particle size of ≤2.0 µm, more preferably of ≤1.8 µm, even more preferably of ≤1.5 µm and most preferably of ≤1.0 µm, as measured according to the sedimentation method.

For example, the at least one calcium carbonate-containing material comprises, preferably consists of, particles of which at least 30.0 to 85.0 wt.-%, preferably from 50.0 to 85.0 wt.-% and most preferably from 58.0 to 85.0 wt.-%, have a weight particle size of ≤1.0 µm, as measured according to the sedimentation method.

Additionally or alternatively, the at least one calcium carbonate-containing material comprises, preferably consists of, particles of which at least 50.0 to 95.0 wt.-%, preferably from 58.0 to 95.0 wt.-% and most preferably from 80.0 to 95.0 wt.-%, have a weight particle size of ≤2.0 µm, as measured according to the sedimentation method.

The at least one calcium carbonate-containing material may comprise, preferably consist of, particles having a controlled low top cut, for example, of ≤9.5 µm. The term "top cut" (or top size), as used herein, means the particle size value wherein at least 98.0 wt.-% of the material particles are less than that size. Preferably, the at least one calcium carbonate-containing material comprises, preferably consists of, particles having a top cut of ≤8.0 µm and more preferably of ≤7.5 µm.

It is one requirement of the instant invention that the at least one calcium carbonate-containing material comprises particles having a low BET specific surface are. In particular, it is required that the at least one calcium carbonate-containing material comprises particles having a BET specific surface of from 4.0 to 12.0 m$^2$/g, measured by nitrogen gas adsorption using the BET isotherm (ISO 9277:2010) and is specified in m$^2$/g. Preferably, the at least one calcium carbonate-containing material consists of particles having a BET specific surface area of from 4.0 to 12.0 m$^2$/g, measured by nitrogen gas adsorption using the BET isotherm (ISO 9277:2010).

In one embodiment at least one calcium carbonate-containing material comprises particles having a BET specific surface area of from 5.0 to 10.0 m$^2$/g, measured by nitrogen gas adsorption using the BET isotherm (ISO 9277:2010). Preferably, at least one calcium carbonate-containing material consists of particles having a BET specific surface area of from 5.0 to 10.0 m$^2$/g, measured by nitrogen gas adsorption using the BET isotherm (ISO 9277:2010).

It is appreciated that the crumbles may further comprise at least one further particulate filler material.

In one embodiment the crumbles consists of the at least one calcium carbonate-containing material, preferably dolomite and/or the at least one ground calcium carbonate (GCC), and optionally at least one further particulate filler material. For example, the crumbles consists of the at least one calcium carbonate-containing material, preferably dolomite and/or the at least one ground calcium carbonate (GCC), and at least one further particulate filler material.

The term "at least one" further particulate filler material in the meaning of the present invention means that the further particulate filler material comprises, preferably consists of, one or more further particulate filler material.

In one embodiment of the present invention, the at least one further particulate filler material comprises, preferably consists of, one further particulate filler material. Alternatively, the at least one further particulate filler material comprises, preferably consists of, two or more further particulate filler materials. For example, the at least one further particulate filler material comprises, preferably consists of, two or three further particulate filler materials.

Preferably, the at least one further particulate filler material comprises, more preferably consists of, one further particulate filler material.

In one embodiment the crumbles are free of the at least one further particulate filler material. That is to say, the particulate material of the crumbles preferably consists of the at least one calcium carbonate-containing material.

If the crumbles comprise at least one further particulate filler material, the at least one further particulate filler material is preferably selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

The crumbles may comprise at least one further particulate filler material, wherein the at least one further particulate filler material is preferably precipitated calcium carbonate (PCC).

The crumbles preferably contains the at least one calcium carbonate-containing material in an amount of at least 70.0 wt.-%, more preferably at least 80.0 wt.-% and most preferably at least 90.0 wt.-%, based on the total dry weight of the crumbles. For example, the crumbles may contain the at least one calcium carbonate-containing material in an amount from 70.0 to 100.0 wt.-%, more preferably from 80.0 to 100.0 wt.-% and most preferably from 90.0 to 100.0 wt.-% or from 90.0 to 99.7 wt.-%, based on the total dry weight of the crumbles.

The crumbles may contain the at least one further particulate filler material in an amount of at most 30.0 wt.-%, more preferably at most 20.0 wt.-% and most preferably at most 10.0 wt.-%, based on the total dry weight of the crumbles. For example, the crumbles may contain the at least one further particulate filler material in an amount from 0.0 to 30.0 wt.-%, more preferably from 0.0 to 20.0 wt.-% and most preferably from 0.0 to 10.0 wt.-% or from 0.2 to 10.0 wt.-%, based on the total dry weight of the crumbles.

However, it is appreciated that the crumbles may also contain the at least one further particulate filler material in an amount of more 30.0 wt.-% such as e.g. in an amount of 50.0 wt.-% or 75.0 wt.-%, based on the total dry weight of the crumbles, but in order to obtain crumbles having more favourable properties, it is preferred that the crumbles contain the at least one further particulate filler material in an amount of at most 30.0 wt.-%, more preferably at most 20.0 wt.-% and most preferably at most 10.0 wt.-%, based on the total dry weight of the crumbles.

In one embodiment the crumbles consists of 70.0 to 100.0 wt.-%, based on the total dry weight of the crumbles, of the at least one calcium carbonate-containing material, and of 0.0 to 30.0 wt.-%, based on the total dry weight of the crumbles, of the at least one further particulate filler material, preferably of 80.0 to 100.0 wt.-%, based on the total dry weight of the crumbles, of the at least one calcium carbonate-containing material, and of 0.0 to 20.0 wt.-%, based on the total dry weight of the crumbles, of the at least one further particulate filler material and more preferably of 90.0 to 100.0 wt.-%, based on the total dry weight of the crumbles, of the at least one calcium carbonate-containing material, and of 0.0 to 10.0 wt.-%, based on the total dry weight of the crumbles, of the at least one further particulate filler material.

Alternatively, the crumbles consists of 90.0 to 99.8 wt.-%, based on the total dry weight of the crumbles, of the at least one calcium carbonate-containing material, and of 0.2 to 10.0 wt.-%, based on the total dry weight of the crumbles, of the at least one further particulate filler material.

Preferably, the crumbles consist of the at least one natural calcium carbonate-containing material, more preferably dolomite and/or the at least one ground calcium carbonate (GCC). For example, the crumbles consists of the at least one ground calcium carbonate (GCC). In one embodiment of the present invention, the at least one ground calcium carbonate (GCC) is selected from the group comprising marble, chalk, limestone and mixtures thereof.

It is one requirement of the present invention that the crumbles have specific solids content in order to avoid the disadvantages of slurries, i.e. the use of biocides and/or dispersants, high weight and volume for transportation, and powders, i.e. low bulk density and flow properties at high dusting. Thus, it is required that the crumbles have solids content of 78.0 wt.-% to 90.0 wt.-%, based on the total weight of the crumbles. Preferably, the crumbles have solids content of 80.0 wt.-% to 88.0 wt.-%, based on the total weight of the crumbles.

It is appreciated that the above solids content refers to crumbles obtained right after the process described below. It is thus appreciated that the crumbles may have higher solids content, such as of up to 98.0 wt.-%, based on the total weight of the crumbles, if they are stored at room temperature.

It is appreciated that the crumbles have specifically low moisture pick-up susceptibility.

The "moisture pick-up susceptibility" of a material refers to the amount of moisture absorbed on the surface of said material within a certain time upon exposure to a defined humid atmosphere and is expressed in mg/g.

It is preferred that the crumbles have a moisture pick up susceptibility such that its total surface moisture level is ≤0.6 mg/g, preferably ≤0.5 mg/g, more preferably ≤0.4 mg/g and most preferably ≤0.3 mg/g of the dry crumbles after exposure to an atmosphere of 50% of relative humidity for 48 hours at a temperature of 23° C.

Additionally or alternatively, the crumbles have moisture content of from 0.2 wt.-% to 0.6 wt.-%, preferably from 0.2 wt.-% to 0.4 wt.-% and most preferably from 0.25 wt.-% to 0.35 wt.-% based on the total dry weight of the crumbles.

In one embodiment of the present invention, the crumbles comprise on at least a part of the particle's accessible surface area a treatment layer comprising a hydrophobizing agent.

The term "accessible" surface area of a material refers to the part of the material surface which is in contact with a liquid phase of an aqueous solution, suspension, dispersion or reactive molecules such as a hydrophobizing agent.

In one embodiment, the hydrophobizing agent is an aliphatic carboxylic acid having a total amount of carbon atoms from C4 to C24 and/or reaction products thereof. Accordingly, at least a part of the accessible surface area of the calcium carbonate-containing material particles is covered by a treatment layer comprising an aliphatic carboxylic acid having a total amount of carbon atoms from C4 to C24 and/or reaction products thereof.

The term "reaction products" of the aliphatic carboxylic acid in the meaning of the present invention refers to products obtained by contacting the at least one calcium carbonate-containing material with the at least one aliphatic carboxylic acid. Said reaction products are formed between at least a part of the applied at least one aliphatic carboxylic acid and reactive molecules located at the surface of the calcium carbonate-containing material particles.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof.

For example, the aliphatic carboxylic acid is stearic acid.

Additionally or alternatively, the hydrophobizing agent can be at least one mono-substituted succinic anhydride consisting of succinic anhydride mono-substituted with a group selected from a linear, branched, aliphatic and cyclic group having a total amount of carbon atoms from C2 to C30 in the substituent. Accordingly, at least a part of the accessible surface area of the calcium carbonate-containing material particles is covered by a treatment layer comprising at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof.

The term "reaction products" of the mono-substituted succinic anhydride in the meaning of the present invention refers to products obtained by contacting the at least one calcium carbonate-containing material with the at least one mono-substituted succinic anhydride. Said reaction products are formed between at least a part of the applied at least one mono-substituted succinic anhydride and reactive molecules located at the surface of the calcium carbonate-containing material particles.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent or a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

It is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butyl succinic anhydride and/or tert-butyl succinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear alkenyl group having a total amount of carbon atoms from C2 to C30, preferably from C3 to C20 and most preferably from C4 to C18 in the substituent or a branched alkenyl group having a total amount of carbon atoms from C3 to C30, preferably from C4 to C20 and most preferably from C4 to C18 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5-wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

Additionally or alternatively, the hydrophobizing agent may be a phosphoric acid ester blend. Accordingly, at least a part of the accessible surface area of the calcium carbonate-containing material particles is covered by a treatment layer comprising a phosphoric acid ester blend of one or more phosphoric acid mono-ester and/or reaction products thereof and one or more phosphoric acid di-ester and/or reaction products thereof.

The term "reaction products" of the phosphoric acid mono-ester and one or more phosphoric acid di-ester in the meaning of the present invention refers to products obtained by contacting the at least one calcium carbonate-containing material with the at least one phosphoric acid ester blend. Said reaction products are formed between at least a part of the applied phosphoric acid ester blend and reactive molecules located at the surface of the calcium carbonate-containing material particles.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the coating layer of the at least one calcium carbonate-containing material and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the accessible surface area of the at least one calcium carbonate-containing material comprises a phosphoric acid ester blend of one phosphoric acid mono-ester and/or reaction products thereof and one phosphoric acid di-ester and/or reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

The phosphoric acid ester blend comprises the one or more phosphoric acid mono-ester and/or reaction products thereof to the one or more phosphoric acid di-ester and/or reaction products thereof in a specific molar ratio. In particular, the molar ratio of the one or more phosphoric acid mono-ester and/or reaction products thereof to the one or more phosphoric acid di-ester and/or reaction products thereof in the treatment layer and/or the phosphoric acid ester blend is from 1:1 to 1:100, preferably from 1:1.1 to 1:60, more preferably from 1:1.1 to 1:40, even more preferably from 1:1.1 to 1:20 and most preferably from 1:1.1 to 1:10.

The wording "molar ratio of the one or more phosphoric acid mono-ester and reaction products thereof to the one or more phosphoric acid di-ester and reaction products thereof" in the meaning of the present invention refers to the sum of the molecular weight of the phosphoric acid mono-ester molecules and/or the sum of the molecular weight of the phosphoric acid mono-ester molecules in the reaction products thereof to the sum of the molecular weight of the phosphoric acid di-ester molecules and/or the sum of the molecular weight of the phosphoric acid di-ester molecules in the reaction products thereof.

In one embodiment of the present invention, the phosphoric acid ester blend coated on at least a part of the surface of the at least one calcium carbonate-containing material may further comprise one or more phosphoric acid tri-ester and/or phosphoric acid and/or reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the accessible surface area of the at least one calcium carbonate-containing material.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

It is preferred that at least a part of the accessible surface area of the at least one calcium carbonate-containing material particles comprises a treatment layer comprising stearic acid and/or reaction products thereof.

If the crumbles comprise at least one further particulate filler material, the at least one further particulate filler material may comprise on at least a part of the accessible surface area of filler material a treatment layer comprising a hydrophobizing agent, preferably an aliphatic carboxylic acid having a total amount of carbon atoms from C4 to C24 and/or reaction products thereof and/or at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof and/or a phosphoric acid ester blend of one or more phosphoric acid mono-ester and/or reaction products thereof and one or more phosphoric acid di-ester and/or reaction products thereof.

With regard to the definition of the hydrophobizing agent for the at least one further particulate filler material and preferred embodiments thereof, reference is made to the statements provided above when discussing the technical details of the hydrophobizing agent used for the calcium carbonate-containing material particles of the crumbles of the present invention.

If the calcium carbonate-containing material particles of the crumbles and the at least one further particulate filler material comprise on at least a part of the accessible surface area a treatment layer comprising a hydrophobizing agent, the hydrophobizing agent is preferably the same.

It is appreciated that the crumbles comprising the at least one calcium carbonate-containing material provide exceptional optical characteristics. In particular, it is appreciated that the crumbles comprising at least one calcium carbonate-containing material have a degree of whiteness R457, measured in accordance with the ISO 2469 Standard, of at least 85.0%, more preferably of at least 87.0%, even more preferably of at least 89.0% and most preferably of at least 91.0%. For example, the crumbles comprising the at least one calcium carbonate-containing material have a degree of whiteness R457, measured in accordance with the ISO 2469 Standard, of from 85.0 to 99.0%, preferably from 87.0 to 99.0%, more preferably from 89.0 to 99.0% and most preferably from 91.0% to 99.0%. Most preferably, the crumbles comprising the at least one calcium carbonate-containing material have a degree of whiteness R457, measured in accordance with the ISO 2469 Standard, of at least 93.0%, e.g. from 93.0 to 99.0%.

Additionally or alternatively, the crumbles comprising at least one calcium carbonate-containing material have a Yellowness Index according to DIN 6167 of less than 3.0, preferably of less than 2.5, more preferably of less than 2.0 and most preferably of less than 1.5.

It is appreciated that the crumbles comprising the at least one calcium carbonate-containing material may be further suspended in an aqueous medium. That is to say, the crumbles comprising the at least one calcium carbonate-containing material can be provided in the form of a suspension. If the crumbles comprising the at least one calcium carbonate-containing material are provided in form of a suspension, said crumbles are optionally dispersed. Conventional dispersants known to the skilled person can be used. The dispersant can be non-ionic, anionic, cationic, zwitterionic or amphoteric. A preferred dispersing agent is polyacrylate-based dispersant like a salt of a polyacrylate. Such dispersing agents are preferably present in the slurry in an amount from about 0.2 wt.-% to about 3.0 wt.-%, based on the total dry weight of the crumbles.

Process for the Preparation of the Crumbles

It is appreciated that the inventors found that the properties of a calcium carbonate-containing material can be improved by a process comprising a specific sequence of process steps as defined herein.

A process for the preparation of crumbles comprising at least one calcium carbonate-containing material is provided. The process comprises the steps of:
  a) providing at least one calcium carbonate-containing material in the form of an aqueous slurry having solids content in the range from 5.0 to 45.0 wt.-%, based on the total weight of the slurry,
  b) wet grinding the at least one calcium carbonate-containing material of step a) to obtain an aqueous slurry of the at least one wet-ground calcium carbonate-containing material, wherein the particles of the at least one wet-ground calcium carbonate-containing material have a
     i) weight particle size $d_{75}$ of 0.7 to 3.0 µm,
     ii) weight median particle size $d_{50}$ of 0.5 to 2.0 µm,
     iii) weight particle size $d_{25}$ of 0.1 to 1.0 µm, as measured according to the sedimentation method, and
     iv) a BET specific surface area of from 4.0 to 12.0 m$^2$/g, measured by the measured by nitrogen gas adsorption using the BET isotherm (ISO 9277:2010),
  c) mechanical dewatering of the aqueous slurry of step b) to obtain crumbles comprising the at least one calcium carbonate-containing material having solids content of 78.0 wt.-% to 90.0 wt.-%, based on the total weight of the crumbles.

With regard to the definition of the crumbles comprising the at least one calcium carbonate-containing material and preferred embodiments thereof, reference is made to the statements provided above when discussing the technical details of the crumbles of the present invention.

It is appreciated that the at least one calcium carbonate-containing material of step a) is provided in the form of an aqueous slurry. In this respect, the at least one calcium carbonate-containing material provided in step a) may have any particle size distribution allowing the material to be subjected to a wet grinding step. Therefore, the at least one calcium carbonate-containing material may be provided as a comminuted material, for example, in crushed or preground form. Preferably, the at least one calcium carbonate-containing material of step a) is provided in a preground form.

According to one embodiment the at least one calcium carbonate-containing material of step a) is obtained by dry pregrinding. According to another embodiment of the present invention the at least one calcium carbonate-containing material of step a) is obtained by wet pregrinding and optional subsequent drying.

In general, the pregrinding step for obtaining the at least one calcium carbonate-containing material of step a) can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the at least one calcium carbonate-containing material provided in step a) comprises a wet preground calcium carbonate-containing material, the pregrinding step may be performed under conditions such that autogenous grinding takes place and/or by horizontal ball milling, and/or other such processes known to the skilled man. The wet processed preground calcium carbonate-containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate-containing material undergoes a beneficiation step, such as a flotation, bleaching or magnetic separation step, to remove impurities.

According to one embodiment, the at least one calcium carbonate-containing material provided in step a) has a weight median particle size $d_{50}$ ranging from 0.1 to 200.0 µm, preferably from 0.2 to 100.0 µm, and more preferably from 0.5 to 50.0 µm, as measured by the sedimentation method.

The aqueous slurry of the at least one calcium carbonate-containing material has solids content of from 5.0 wt.-% to 45.0 wt.-%, preferably from 10.0 wt.-% to 45.0 wt.-%, more preferably from 15.0 wt.-% to 45.0 wt.-% and most preferably from 20.0 wt.-% to 45.0 wt.-%, based on the total weight of the aqueous slurry. For example, the aqueous slurry of the at least one calcium carbonate-containing material provided in step a) has solids content of from 18.0 wt.-% to 45.0 wt.-% or from 30.0 wt.-% to 45.0 wt.-%, based on the total weight of the aqueous slurry.

An aqueous "slurry" or "suspension" in the meaning of the present invention comprises insoluble solids and water and usually may contain large amounts of solids and, thus, can be more viscous and generally of higher density than the liquid from which it is formed.

The term "aqueous" slurry or suspension refers to a system, wherein the liquid phase comprises, preferably consists of, water. However, said term does not exclude that the liquid phase of the aqueous slurry comprises minor amounts of at least one water-miscible organic solvent selected from the group comprising methanol, ethanol, acetone, acetonitrile, tetrahydrofuran and mixtures thereof. If the aqueous slurry comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous slurry. For example, the liquid phase of the aqueous slurry consists of water.

The water to be used for preparing the aqueous slurry of step a) is tap water, deionized water, process water or rain water, or a mixture thereof. Preferably, the water used for preparing the aqueous slurry of step a) is tap water.

It is preferred that the aqueous slurry of the at least one calcium carbonate-containing material provided in step a) is free of dispersing agents.

According to step b) of the process according to the present invention, the at least one calcium carbonate-containing material of step a) is wet ground to obtain an aqueous slurry of the at least one wet-ground calcium carbonate-containing material such that the particles of the at least one wet-ground calcium carbonate-containing material have a
  i) weight particle size $d_{75}$ of 0.7 to 3.0 µm,
  ii) weight median particle size $d_{50}$ of 0.5 to 2.0 µm,
  iii) weight particle size $d_{25}$ of 0.1 to 1.0 µm, as measured according to the sedimentation method, and
  iv) a BET specific surface area of from 4.0 to 12.0 m$^2$/g, measured by nitrogen gas adsorption using the BET isotherm (ISO 9277:2010).

It is appreciated that process step b) is preferably carried out in at least one grinding unit to obtain the wet ground calcium carbonate-containing material.

The term "wet grinding" in the meaning of the process according to the present invention refers to the comminution (e.g., in a ball mill) of solid material (e.g., of mineral origin) in the presence of water meaning that said material is in form of an aqueous slurry or suspension.

For the purposes of the present invention, any suitable mill known in the art may be used. However, process step b) is preferably carried out in a vertical or horizontal ball mill, more preferably a horizontal ball mill. Such vertical and horizontal ball mills usually consist of a vertically or horizontally arranged, cylindrical grinding chamber comprising an axially fast rotating agitator shaft being equipped with a plurality of paddles and/or stirring discs, such as described for example in EP 0607840 A1.

It is to be noted that process step b) is carried out by using at least one grinding unit, i.e. it is also possible to use a series of grinding units which may, for example, be selected from ball mills such as vertical or horizontal ball mills.

The amount of water being present during process step b) may be expressed by the total moisture content which is based on the total weight of said slurry. The process according to the present invention is characterized in that the grinding step is carried out at low solids contents, i.e. at high total moisture contents, for example at a total moisture content ranging from 65.0 to 90.0 wt.-%, based on the total weight of said slurry.

According to one embodiment, the total moisture content during process step b) ranges from 70.0 to 88.0 wt.-%, preferably from 73.0 to 86.0 wt.-%, and more preferably from 74.0 to 85.0 wt.-%, based on the total weight of the slurry.

Thus, it is appreciated that the aqueous slurry of the at least one wet-ground calcium carbonate-containing material during process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry.

Thus, it is appreciated that process step b) is carried out in that the aqueous slurry of the at least one wet-ground calcium carbonate-containing material provided in step a) is further diluted with water to the desired solids content during process step b).

Accordingly, the aqueous slurry of the at least one wet-ground calcium carbonate-containing material obtained in step b) has lower solids content than the aqueous slurry of the at least one calcium carbonate-containing material provided in step a).

Thus, the aqueous slurry of the at least one wet-ground calcium carbonate-containing material obtained in process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry.

In one embodiment of the present process, step b) is carried out in the presence of at least one further particulate filler material.

If process step b) is carried out in the presence of at least one further particulate filler material, the at least one further particulate filler material is preferably selected from the group comprising precipitated calcium carbonate (PCC), metal oxides such as titanium dioxide and/or aluminium trioxide, metal hydroxides such as aluminium tri-hydroxide, metal salts such as sulfates, silicates such as talc and/or kaolin and/or kaolin clay and/or mica, carbonates such as magnesium carbonate and/or gypsum, satin white and mixtures thereof.

Thus, if process step b) is carried out in the presence of at least one further particulate filler material, the aqueous slurry of the at least one calcium carbonate-containing material provided in step a) further comprises the at least one further particulate filler material. It is to be noted that the aqueous slurry of the at least one wet-ground calcium carbonate-containing material and the at least one further particulate filler material during process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry. Accordingly, the aqueous slurry of the at least one wet-ground calcium carbonate-containing material and the at least one further particulate filler material obtained in process step b) has solids content in the range from 10.0 to 35.0 wt.-%, preferably from 12.0 to 30.0 wt.-%, more preferably from 14.0 to 27.0 wt.-% and most preferably from 15.0 to 26.0 wt.-%, based on the total weight of the slurry.

It is to be noted that process step b) is carried out such that a wet-ground material having the particle size distribution as defined for the crumbles comprising the at least one calcium carbonate-containing material is obtained. Thus, it is appreciated that process step b) is carried out such that the weight median particle size $d_{50}$ of the at least one wet-ground calcium carbonate-containing material obtained in step b) is decreased compared to the at least one calcium carbonate-containing material provided in step a). Accordingly, the at least one wet-ground calcium carbonate-containing material obtained in step b) has a i) weight particle size $d_{75}$ of 0.7 to 3.0 µm, ii) weight median particle size $d_{50}$ of 0.5 to 2.0 µm, and weight particle size $d_{25}$ of 0.1 to 1.0 µm, as measured according to the sedimentation method.

Additionally, process step b) is carried out such that a wet-ground material having the BET specific surface area as defined for the crumbles comprising the at least one calcium carbonate-containing material is obtained. Thus, it is appreciated that process step b) is carried out in that the BET specific surface area of the at least one wet ground calcium carbonate-containing material obtained in step b) is decreased compared to the at least one calcium carbonate-containing material provided in step a). Accordingly, the at least one wet-ground calcium carbonate-containing material obtained in step b) has a BET specific surface area of from 4.0 to 12.0 m$^2$/g, measured by nitrogen gas adsorption using the BET isotherm (ISO 9277:2010).

It is preferred that process step b) is carried out in the absence of dispersing agents. Thus, the aqueous slurry obtained in process step b) is preferably free of dispersing agents.

Wet grinding step b) is preferably carried out at a starting temperature which is of about room temperature or of elevated temperature. For the purposes of the process according to the present invention, a temperature ranging from 15° C. to 85° C. is particularly suitable as starting temperature.

According to another embodiment, the starting temperature in step b) ranges from 15° C. to 60° C., preferably from 20° C. to 50° C. and most preferably from 20° C. to 40° C.

During wet grinding step b), the temperature is allowed to rise above the starting temperature of process step b). For example, the temperature in step b) may rise to a temperature of up to 100° C.

It is a further requirement of the instant process that the aqueous slurry obtained in process step b) is subjected to a mechanical dewatering in process step c) such as to obtain crumbles comprising the at least one calcium carbonate-containing material having solids content of 78.0 wt.-% to 90.0 wt.-%, based on the total weight of the crumbles.

Such mechanical dewatering may be undertaken by all the techniques and methods well known to the man skilled in the art for reducing the water content of an aqueous slurry comprising at least one wet-ground calcium carbonate-containing material to solids content of 78.0 wt.-% to 90.0 wt.-%, based on the total weight of the obtained crumbles. The mechanical dewatering in process step c) is preferably carried out in a vertical plate pressure filter, a tube press or a vacuum filter. More preferably, process step c) is carried out in a tube press.

A tube press is a membrane type filter press and capable of operating at high filtration pressures up to 150.0 bar. Preferably, process step c) is carried out under pressure, even more preferably a pressure from 20.0 bar to 140.0 bar, more preferably from 65.0 bar to 120.0 bar and most preferably from 80.0 to 110.0 bar.

The use of these high pressures enables a higher degree of separation of the liquid and solid phases. The principles of operation of a tube press are as follows:

The filtration takes place between two concentric cylinders. The outer cylinder is the casing, and the inner, the candle. The process slurry is pumped into the annular space between the filter medium and the bladder. Hydraulic fluid, usually water, is then pumped between the bladder and the casing putting the slurry under pressure and causing filtration to take place. When filtration is complete the hydraulic fluid is withdrawn from the tube unit using vacuum until the bladder is dilated against the casing. The candle is then lowered to the discharge position and a pulse of air is blown between the candle and the filter medium. This causes the filter cloth to expand, fracturing the cake which is discharged under gravity. When complete the candle closes to the slurry fill position to repeat the cycle.

The starting temperature of the mechanical dewatering of process step c) is preferably in the range of 15 to 80° C., preferably at a starting temperature in the range of 20 to 70° C., and more preferably at a starting temperature in the range of 30 to 60° C. For example, the starting temperature of the mechanical dewatering of process step c) is about 50° C.

The temperature during the mechanical dewatering of process step c) is preferably in the range of 15 to 80° C., preferably in the range of 20 to 70° C., and more preferably in the range of 30 to 60° C. For example, the temperature during the mechanical dewatering of process step c) is about 50° C.

It is one requirement of the instant invention that process step c) is carried out such that crumbles comprising the at least one calcium carbonate-containing material are obtained. The crumbles thus have solids content of 78.0 wt.-% to 90.0 wt.-% and preferably from 80.0 wt.-% to 88.0 wt.-%, based on the total weight of the crumbles.

In one embodiment of the instant process, the aqueous slurry of the at least one wet-ground calcium carbonate-containing material obtained in step b) is partially dewatered to solids content in the range from 20.0 to 40.0 wt.-%, based on the total weight of the slurry, before process step c) is carried out.

Such optional dewatering may be undertaken by all the techniques and methods well known to the man skilled in the art for reducing the water content of an aqueous slurry comprising at least one wet-ground calcium carbonate-containing material to the desired solids content. The optional dewatering before process step c) can be preferably carried out mechanically or thermally such as by filtration, centrifugation, sedimentation in a settling tank, evaporation etc., preferably by centrifugation or settling.

It is preferred that process step c) is carried out in the absence of dispersing agents. Thus, the crumbles comprising the at least one calcium carbonate-containing material obtained in process step c) are preferably free of dispersing agents.

The process according to the present invention may further comprise drying step $d_1$) (also referred to as "drying step"). In said drying step, the crumbles obtained in step c) are dried to obtain dried crumbles.

In general, the drying step according to the process according to the present invention may be carried out by any drying method known to the skilled person for drying materials having solids content from 78.0 to 90.0 wt.-%, based on the total weight of the material.

According to one embodiment, drying step $d_1$) is carried out in a cell mill as known by the skilled person. Preferably said drying step is carried out at a temperature ranging from 90° C. to 130° C. and preferably from 100° C. to 120° C.

By means of drying step $d_1$), dried crumbles are obtained having a low total moisture content which is less than or equal to 3.0 wt.-%, based on the total weight of said dried crumbles.

Thus, it is appreciated that the crumbles comprising the at least one calcium carbonate-containing material obtained in optional drying step $d_1$) have solids content of ≥97.0 wt.-%, preferably from 97.0 to 99.98 wt.-% and most preferably from 97.0 to 99.98 wt.-%, based on the total weight of the crumbles.

In one embodiment of the present invention, the process according to the present invention for the preparation of crumbles comprising at least one calcium carbonate-containing material further comprises a process step $d_2$) of treating the crumbles obtained in step c) with a hydrophobizing agent (also referred to as "treatment step") in order to obtain surface-treated crumbles. By means of said treatment step, a treatment layer comprising the hydrophobizing agent is formed on at least a part of the accessible surface area of the calcium carbonate-containing material particles.

The hydrophobizing agent used in treatment step $d_2$) may be any agent known to the skilled person which is capable to form a hydrophobic treatment layer on at least a part of the accessible surface area of the calcium carbonate-containing material particles.

In one embodiment, the hydrophobizing agent in treatment step $d_2$) is an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric acid di-ester.

With regard to the definition of the aliphatic carboxylic acid having a total amount of carbon atoms from C4 to C24, the at least one mono-substituted succinic anhydride consisting of succinic anhydride mono-substituted with a group selected from a linear, branched, aliphatic and cyclic group having a total amount of carbon atoms from C2 to C30 in the substituent, the phosphoric acid ester blend of one or more phosphoric acid mono-ester and one or more phosphoric acid di-ester and preferred embodiments thereof, reference is made to the statements provided above when discussing the technical details of the crumbles of the present invention.

In one embodiment of the process according to the present invention, the temperature in treatment step $d_2$) ranges from 70° C. to 140° C., preferably from 75° C. to 130° C., and more preferably from 80° C. to 125° C.

In one embodiment, the treatment step may be carried out directly after mechanical dewatering step c) or, if present, after drying step $d_1$) or before use.

In another embodiment drying step $d_1$) and treatment step $d_2$) are carried out simultaneously, this means the hydrophibizing agent is added during/or before step $d_1$). This embodiment is in particular preferred for film applications, like blown films or breathable films, or for polyvinyl chloride applications of the obtained crumbles.

The surface-treated crumbles obtained after treatment step $d_2$) preferably have a low total moisture content. Therefore, according to one embodiment, said surface-treated crumbles have a total moisture content of less than or equal to 3.0 wt.-%, based on the total weight of said crumbles.

Thus, it is appreciated that the crumbles comprising the at least one calcium carbonate-containing material obtained in optional treatment step $d_2$) have solids content of ≥97.0 wt.-%, preferably from 97.0 to 99.97 wt.-% and most preferably from 98.0 to 99.97 wt.-%, based on the total weight of the crumbles.

Additionally or alternatively, the process according to the present invention for the preparation of crumbles comprising at least one calcium carbonate-containing material further comprises a process step $d_3$) of treating the crumbles obtained in step c) with a dispersing agent (also referred to as "dispersing step") in order to obtain dispersed crumbles.

Such dispersing step $d_3$) can be carried out by the use of common dispersing agents. Preferred dispersing agents are polyacrylate-based dispersants like a salt of a polyacrylate. The dispersing agent is preferably selected from the group consisting of an acrylic polymer, an acrylic and a vinylic copolymer and mixtures thereof. Dispersing agents such as acrylic polymers, acrylic and vinylic copolymers or mixtures thereof having multiple acidic sites can be partially or totally neutralised. In one embodiment, the dispersing agent which may be used in dispersing step d) is partially or completely neutralized, preferably to a degree of 5.0% to 100.0%, more preferably to a degree of 25.0% to 100.0% and most preferably to a degree of 75.0% to 100.0% using a neutralizing agent containing ions of alkali metals and/or alkaline earth metals. For example, the acidic sites of the dispersing agent are neutralized using a neutralizing agent containing only sodium. Alternatively, the acidic sites of the dispersing agent are neutralized using a neutralizing agent containing only potassium. In one embodiment, the acidic sites of the dispersing agent are neutralized using a neutralizing agent containing a mixture of sodium and potassium.

Dispersing step $d_3$) can be performed by the use of any suitable means, and is preferably conducted by the use of a high sheer disperser.

For example, dispersing step $d_3$) is carried out in that an aqueous slurry of the crumbles comprising the at least one calcium carbonate-containing material is formed by suspending the crumbles obtained in process step c) and a dispersing agent in water.

According to one embodiment, the aqueous slurry of dispersed crumbles obtained in dispersing step $d_3$) has solids content of from 10.0 wt.-% to 82.0 wt.-%, preferably from 50.0 wt.-% to 81.0 wt.-%, and most preferably from 50.0 wt.-% to 78.0 wt.-%, based on the total weight of the aqueous slurry.

According to another aspect of the instant invention, crumbles comprising at least one calcium carbonate-containing material are provided, in which the crumbles are obtainable by the process for the preparation of the crumbles.

Articles and Uses

As the inventive crumbles have a low moisture pick up susceptibility, a defined particle size distribution, BET surface area and top cut as well as a favourable handling, they can be used in a great variety of articles. Thus, the present invention refers in a further aspect to an article comprising the crumbles comprising at least one calcium carbonate-containing material as defined above. Preferably, the article is selected from the group comprising plastic, preferably films, more preferably blown films or breathable films, fibres, polyvinyl chloride, plastisols, thermosetting polymers, more preferably thermosetting unsaturated polyesters or thermosetting unsaturated polyurethanes, food, cosmetic, sealants, pharmaceutical, paper, paper coating, coating, paint, adhesive articles and mixtures thereof.

With regard to the definition of the crumbles comprising the at least one calcium carbonate-containing material and preferred embodiments thereof, reference is made to the statements provided above when discussing the technical details of the crumbles of the present invention.

In one embodiment, the crumbles comprising at least one calcium carbonate-containing material are preferably used in a plastic article.

As the crumbles have a low moisture pick up susceptibility, it may advantageously be used in paper coatings in order to adjust the printing properties of a coated paper. Furthermore, the crumbles may also be used in exterior paints and bathroom paints.

The use of the crumbles according to the present invention as a filler material in plastic articles may also be of particular advantage due to the absence of biocides and/or dispersing agents and the low moisture pick up susceptibility. For example, said crumbles may be used in thermoplastic polymers, such as polyvinyl chloride, polyolefins, and polystyrene.

Moreover, the crumbles may also be used in coatings such as polymer coatings which may be applied on the surface of plastic articles, such as foils, in order to increase the hydrophobicity (e.g., reflected by an increased contact angle measured against water) of said surface.

According to one embodiment, the crumbles are used in a polymer composition, wherein said polymer composition comprises:

a) at least one polymeric resin; and
b) from 0.1 to 90.0 wt.-%, preferably from 1.0 to 85.0 wt.-%, and more preferably from 2.0 to 45.0 wt.-%, based on the total weight of said polymer composition, of the instant crumbles comprising at least one calcium carbonate-containing material.

According to another embodiment, said at least one polymeric resin is a thermoplastic resin and preferably is a polyolefin, polyvinylchloride, or polystyrene.

According to another embodiment, said at least one polymeric resin is a polyolefin and preferably polyethylene or polypropylene.

According to still another embodiment, said at least one polymeric resin is polyvinylchloride.

According to still another embodiment, said at least one polymeric resin is polystyrene.

The polymer composition of the present invention may be used in a number of processes including the manufacture of plastic articles such as blown films or breathable films, fibres, polyvinyl chloride, plastisols, thermosetting polymers, more preferably thermosetting unsaturated polyesters or thermosetting unsaturated polyurethanes, sheets, or pipe profiles, in processes such as extrusion of pipes, profiles, cables, fibres or the like, and in compression molding, injection molding, thermoforming, blow molding, rotational molding, etc.

In this respect, said polymer composition may be directly used in the manufacture of plastic articles. Therefore, in one embodiment of the present invention, the polymer composition comprises the crumbles in an amount from 1.0 to 50.0 wt.-%, preferably of from 5.0 to 45.0 wt.-% and most preferably from 10.0 to 40.0 wt.-%, based on the total weight of the polymer composition.

In an alternative embodiment, the polymer composition may be used as a masterbatch.

The term "masterbatch" refers to a composition having a concentration of the crumbles that is higher than the concentration in the polymer composition used for preparing the final application product. That is to say, the masterbatch is further diluted such as to obtain a polymer composition which is suitable for preparing the final application product.

For example, a polymer composition according to the present invention suitable to be used as a masterbatch comprises the crumbles in an amount of from 50.0 to 95.0 wt.-%, preferably from 60.0 to 95.0 wt.-%, and more preferably from 70.0 to 95.0 wt.-%, based on the total weight of the polymer composition.

Thus, the crumbles comprising the at least one calcium carbonate-containing material can be used in paper making, paper coating, food, plastic, preferably films, more preferably blown films or breathable films, fibres, polyvinyl chloride, plastisols, thermosetting polymers, more preferably thermosetting unsaturated polyesters or thermosetting unsaturated polyurethanes, agricultural, paint, coatings, adhesive, sealant, pharmaceutical, agricultural, construction and/or cosmetic applications. In particular, said crumbles comprising the at least one calcium carbonate-containing material can be used as mineral filler and/or for coating of paper. Alternatively, the crumbles comprising the at least one calcium carbonate-containing material are used in plastic articles.

Thus, the present invention refers in another aspect to the use of the crumbles comprising the at least one calcium carbonate-containing material in paper making, paper coating, food, plastic, preferably films, more preferably blown films or breathable films, fibres, polyvinyl chloride, plastisols, thermosetting polymers, more preferably thermosetting unsaturated polyesters or thermosetting unsaturated polyurethanes, agricultural, paint, coatings, adhesive, sealant, pharmaceutical, agricultural, construction and/or cosmetic applications.

The scope and interest of the invention will be better understood based on the following figures and examples which are intended to illustrate certain embodiments of the invention and are non-limitative.

EXAMPLES

1. Measurement Methods

In the following, materials and measurement methods implemented in the examples are described.

Particle Size Distribution (Mass % Particles with a Diameter<X) and Weight Median Diameter ($d_{50}$) of a Particulate Material Weight grain diameter and grain diameter mass distribution of a particulate material were determined via the sedimentation method, i.e. an analysis of sedimentation behaviour in a gravitational field. The measurement was made with a Sedigraph™ 5120 or a Sedigraph™ 5100 of Micromeritics Instrument Corporation.

The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

BET Specific Surface Area of a Material

Throughout the present document, the specific surface area (in $m^2/g$) of a particulate material was determined using the BET method (using nitrogen as adsorbing gas), which is well known to the skilled man (ISO 9277:1995). The total surface area (in $m^2$) of the particulate material is then obtained by multiplication of the specific surface area and the mass (in g) of the particulate material. The method and the instrument are known to the skilled person and are commonly used to determine the specific surface of particulate materials.

Solids Content

The solids content (also known as "dry weight") was determined using a Moisture Analyser HR73 from the company Mettler-Toledo, Switzerland, with the following settings: temperature of 120° C., automatic switch off 3, standard drying, 5 to 20 g of product.

Calcium Carbonate Content of a Particulate Material

For the measurement of the calcium carbonate content of a particulate material, about 10.000 grams of the dry sample (dried at 110° C. for 5 hours in an oven) were weighed in a flask/beaker and a small amount of demineralized water was added. Then, 40 mL of hydrochloric acid (25% p.a.) were added to the respective sample and after the $CO_2$ development stopped, the mixture was boiled for about 5 min. After cooling down, the mixture was filtered through a 0.8 μm cellulose-acetate filter and washed thoroughly. Then the filtrate was quantitatively rinsed to a volumetric flask with distilled water and filled up to 1000.0 ml at 20° C.

The thus obtained filtrate was then slowly titrated by pipetting 10.00 mL of the obtained filtrate (about 20° C.) into a Memotitrator-beaker and 1.0 g (±0.2 g) of triethanolamine puris. and 3.0 g of $MgSO_4×7 H_2O$. The mixture was diluted with demineralized water up to 70 mL and then, just before the titration, 10.0 mL of 2N sodium hydroxide and 7 to 9 drops of a HHSNN-methanol solution (0.2 wt.-% of HHSNN in methanol) were added to the mixture. After the pre-dosing, the titrator stirred the mixture for 60 s and then the phototrode voltage was set to 900 to 1150 mV during titration. The calcium carbonate content was displayed in percent.

Moisture Content

The moisture content of a particulate material was determined by thermogravimetric analysis (TGA). TGA analytical methods provide information regarding losses of mass with great accuracy, and is common knowledge; it is, for example, described in "Principles of Instrumental analysis", fifth edition, Skoog, Holler, Nieman, 1998 (first edition 1992) in Chapter 31 pages 798 to 800, and in many other commonly known reference works. In the present invention, thermogravimetric analysis (TGA) is performed using a Mettler Toledo TGA 851 based on a sample of 500+/−50 mg and scanning temperatures from 25° C. to 350° C. at a rate of 20° C./minute under an air flow of 70 ml/min.

Alternatively, the moisture content of the particles was determined by the oven method.

Moisture Pick-up Susceptibility

The term "moisture pick up susceptibility" in the meaning of the present invention refers to the amount of moisture absorbed on the surface of the calcium carbonate-containing particles and is determined in mg moisture/g of the dry crumbles after exposure to an atmosphere of 50% of relative humidity for 48 hours at a temperature of 23° C.

Pigment Whiteness, Paper Opacity, Light Scattering and CIELAB

Pigment whiteness R457 and paper opacity were measured using an ELREPHO 3000 from the company Datacolor according to ISO 2469:1994 (DIN 53145-2:2000 and DIN 53146:2000). The CIELAB L*, a*, b* coordinates were measured using an ELREPHO 3000 from the company Datacolor according to EN ISO 11664-4 and barium sulfate as standard.

Charpy Impact Strength

Charpy impact strength (23° C.±2° C. and 50% relative humidity±10% relative humidity) was measured according to ISO 179/1eA on extruded samples which were cut out of the extrudate in machine direction.

Breaking Force and Elongation at Break

The breaking force is the force needed to be applied on a yarn to make it break. It is expressed in Newton [N]. The elongation at break is the increase of the length produced by stretching a yarn to its breaking point. It is expressed as a percentage [%] of its initial length.

Tenacity

The tenacity is calculated from the breaking force and the linear density, and expressed in centinewton per tex [cN/tex]. The test is carried out on a dynamometer with a constant stretching speed, applicable standards for this test are EN ISO 5079 and ASTM D 3822.

Tensile Index

The tensile index is the product of tenacity [cN/tex] and the square root of the elongation at break [%].

Tensile Strength and Elongation

Tensile strength [kN/m] and the elongation at maximum load [%] are measured in machine direction (MD) and in cross machine direction (CD). The energy value according to EN ISO 10319 is calculated by the tensile strength (MD+CD)/2.

Surface Gloss

The surface gloss was measured with a Byk Spectro Guide Sphere Gloss at an angle of 60° from the plane surface according to ISO 2813:1994. The gloss value is determined by calculating the average value of n measurement. In the present set up n=10.

Filter Pressure Value

The filter pressure test provides for the Filter Pressure Value. The Filter Pressure Value FPV is defined as the increase of pressure per gram filler. This test is performed to determine the dispersion quality and/or presence of excessively coarse particles or agglomerates of mineral materials in a masterbatch. Low Filter Pressure Values refer to a good dispersion and fine material, wherein high Filter Pressure Values refer to bad dispersion and coarse or agglomerated material.

The Filter Pressure test was performed on a commercially available Collin Pressure Filter Test, Teach-Line FT-E20T-IS, according to the standard EN 13900-5. Filter type used was 14 µm and 25 µm, extrusion was carried out at 200° C.

K-Value of PVC: A measure of the molecular weight of PVC based on measurements of viscosity of a PVC solution. It ranges usually between 35 and 80. Low K-values imply low molecular weight (which is easy to process but has inferior properties) and high K-values imply high molecular weight, (which is difficult to process, but has outstanding properties). In general, K-values for a particular PVC resin are provided by the resin producer either on the packaging or the accompanying technical data sheet.

2. Examples

The following crumbles were prepared:

Crumbles A:

Crumbles A of a calcium carbonate-containing material were obtained by wet grinding an aqueous slurry of calcium carbonate (marble; $d_{50}$=1.6 µm) having solids content of about 35.0 wt.-%, based on the total weight of the slurry. The slurry was wet ground in a vertical ball mill to a final particle size distribution as described in table 1 herein below. The slurry obtained after wet grinding had solids content of about 20.0 wt.-%, based on the total weight of the slurry.

The wet ground calcium carbonate-containing material was then dewatered by using a vertical tube press filter (Metso Corporation, Finland) operating at about 95 bars and a temperature of about 50° C. The pressure is reached by a hydraulic system. The obtained crumbles A had properties as described in table 1 below.

TABLE 1

Properties of the crumbles

|  | Crumbles A | Crumbles B | Crumbles C | Crumbles D |
|---|---|---|---|---|
| $d_{50}$ [µm] | 1.6 | 0.8 | 1.5 | 1.0 |
| <1 µm (by sedimentation) [wt.-%] | 30 | 60 | 33.3 | 45 |
| <2 µm (by sedimentation) [wt.-%] | 55 | 90 | 62.1 | 75 |
| sc final [wt.-%] | 85-88 | 85 | 86.6 | 85 |
| Brightness | >94 | >94 | 94.6 | >93 |
| Yellowness index | <1.5 | <1.5 | 1.1 | <1.5 |
| Cielab a* | ≈0 | ≈0 | ≈0 | ≈0 |
| Cielab b* | ≈0.5 | ≈0.4 | 0.6 | ≈0.6 |
| Cielab L* | ≈97 | ≈97 | 98.2 | ≈98 |
| BET surface area [m²/g] | 4-5 | 6-7 | 5.7 | 6 |

Crumbles B:

Crumbles B of a calcium carbonate-containing material were obtained by wet grinding an aqueous slurry of calcium carbonate (marble; $d_{50}$=0.8 µm) having solids content of about 35.0 wt.-%, based on the total weight of the slurry. The slurry was wet ground in a vertical ball mill to a final particle size distribution as described in table 1 herein below. The slurry obtained after wet grinding had solids content of about 20.0 wt.-%, based on the total weight of the slurry.

The wet ground calcium carbonate-containing material was then dewatered by using a vertical tube press filter (Metso Corporation, Finland) operating at about 95 bars and a temperature of about 50° C. The pressure is reached by a hydraulic system. The obtained crumbles B had properties as described in table 1 above.

The obtained crumble particles were further surface-treated by using stearic acid. 200 g of the obtained crumbles were diluted with water to solids content of 20.0 wt.-%, based on the total weight of the obtained slurry, and heated up to 80° C.

A 0.4 M solution of stearic acid was prepared by mixing 4.1 g of stearic acid with 40 ml of deionised water under stirring at a temperature of 85° C. After 30 min of stirring 2.5 g of a 30 wt.-% sodium hydroxide solution was added to the stearic acid solution (stearic acid/hydroxide mole ratio 1/1.3).

The heated sodium stearate solution was added to the crumble slurry such that a treatment level of 0.5 and 0.7 wt.-%, based on the total weight of the crumbles, respectively, was obtained and stirred for 60 min at 85° C. Subsequently, the slurry was allowed to cool down and pressure filtered afterwards to solids content of about 93.7 wt.-%, based on the total weight of the obtained product.

The obtained surface-treated crumbles B1 (treatment level: 0.5 wt.-%) and B2 (treatment level: 0.7 wt.-%) had properties as described in table 2 below.

TABLE 2

Properties of surface-treated crumbles B1 and B2

|  | Crumbles B1 | Crumbles B2 |
|---|---|---|
| $d_{50}$ [µm] | 0.89 | 0.9 |
| <1 µm (by sedimentation) [wt.-%] | 56.5 | 56.1 |
| <2 µm (by sedimentation) [wt.-%] | 87.8 | 87.0 |
| $d_{98}$ [µm] | 4.4 | 4.1 |
| Brightness | 95.4 | 94.8 |
| Yellowness index | 1.2 | 1.3 |
| Cielab a* | 0.0 | 0.0 |
| Cielab b* | 0.7 | 0.7 |
| Cielab L* | 98.5 | 98.3 |
| BET surface area [m²/g] | 6.3 | 6.4 |

Crumbles C:

Crumbles C of a calcium carbonate-containing material were obtained by wet grinding an aqueous slurry of calcium carbonate (marble; $d_{50}$=1.5 µm) having solids content of about 35.0 wt.-%, based on the total weight of the slurry. The slurry was wet ground in a vertical ball mill to a final particle size distribution as described in table 1 herein below. The slurry obtained after wet grinding had solids content of about 20.0 wt.-%, based on the total weight of the slurry.

The wet ground calcium carbonate-containing material was then dewatered by using a vertical tube press filter (Metso Corporation, Finland) operating at about 95 bars and a temperature of about 50° C. The pressure is reached by a hydraulic system. The obtained crumbles C had properties as described in table 1 above.

The obtained crumble particles were further surface-treated by using stearic acid as described for crumbles B above. The sodium stearate solution was added to the crumble slurry such that a treatment level of 0.9 and 1.2 wt.-%, based on the total weight of the crumbles, respectively, on the crumbles was obtained.

The obtained surface-treated crumbles C1 (treatment level: 0.9 wt.-%) and C2 (treatment level: 1.2 wt.-%) had properties as described in table 3 below.

TABLE 3

Properties of surface-treated crumbles C1 and C2

|  | Crumbles C1 | Crumbles C2 |
|---|---|---|
| $d_{50}$ [µm] | 5.5 | 5.8 |
| <1 µm (by sedimentation) [wt.-%] | 33.5 | 37.7 |

TABLE 3-continued

Properties of surface-treated crumbles C1 and C2

|  | Crumbles C1 | Crumbles C2 |
|---|---|---|
| <2 µm (by sedimentation) [wt.-%] | 63.9 | 67.0 |
| $d_{98}$ [µm] | 5.5 | 5.8 |
| Brightness | 94.1 | 92.7 |
| Yellowness index | 1.4 | 1.7 |
| Cielab a* | 0.0 | 0.0 |
| Cielab b* | 0.8 | 0.9 |
| Cielab L* | 98.1 | 97.6 |
| BET surface area [m²/g] | 4.7 | 4.5 |

Crumbles D:

Crumbles D of a calcium carbonate-containing material were obtained by wet grinding an aqueous slurry of calcium carbonate (marble; $d_{50}$=1.0 µm) having solids content of about 35.0 wt.-%, based on the total weight of the slurry. The slurry was wet ground in a vertical ball mill to a final particle size distribution as described in table 1 herein below. The slurry obtained after wet grinding had solids content of about 20.0 wt.-%, based on the total weight of the slurry.

The wet ground calcium carbonate-containing material was then dewatered by using a vertical tube press filter (Metso Corporation, Finland) operating at about 95 bars and a temperature of about 50° C. The pressure is reached by a hydraulic system. The obtained crumbles D had properties as described in table 1 above.

The obtained crumble particles were further surface-treated by using stearic acid as described for crumbles B above. The sodium stearate solution was added to the crumble slurry such that a treatment level of 0.8 wt.-%, based on the total weight of the crumbles, on the crumbles was obtained.

3. Application

The crumbles prepared above were tested in the following applications:

A) Application in PVC

The crumbles B1 and B2 were tested in the PVC profile extrusion as described in table 4 below.

TABLE 4

Preparation and testing of samples

| Example | B1 (inventive) | B2 (inventive) | Reference 1 | Reference 2 | Reference 3 |
|---|---|---|---|---|---|
| PVC K-value 66 (Evipol SH6630) | 100 (phr) | 100 (phr) | 100 (phr) | 100 (phr) | 100 (phr) |
| Ca—Zn containing stabilizer (Stabilox CZ 2913 GN) | 4.3 (phr) | 4.3 (phr) | 4.3 (phr) | 4.3 (phr) | 4.3 (phr) |
| Lubricant: 12-Hydroxy stearic acid (Realube AIS) | 0.2 (phr) | 0.2 (phr) | 0.2 (phr) | 0.2 (phr) | 0.2 (phr) |
| Lubricant: PE wax (Realube 3010) | 0.15 (phr) | 0.15 (phr) | 0.15 (phr) | 0.15 (phr) | 0.15 (phr) |
| Titanium dioxide (Kronos 2220) | 3.5 (phr) | 3.5 (phr) | 3.5 (phr) | 3.5 (phr) | 3.5 (phr) |
| Acrylic impact modifier (Paraloid KM 366) | 6 (phr) | 6 (phr) | 6 (phr) | 6 (phr) | 6 (phr) |
| Crumbles | 8 or 16 (phr) | 8 or 16 (phr) | 8 or 16 (phr) | 8 (phr) | 8 or 16 (phr) |

The term "phr" in the meaning of the present invention means "parts per hundred resins". In particular, if 100 parts of polymer are used, the quantity of other ingredients is expressed in relation to this 100 parts of polymer by weight.

The reference materials are as follows:

Reference 1: calcium carbonate, commercially available from Omya, Switzerland, having a $d_{50}$ of 0.8 µm, a $d_{98}$ of 5 µm and a BET specific surface area of 8 to 9 m²/g. The particles have a Cielab a* of 0.3, a Cielab b* of 1.8 and a Cielab L* of 97.5. The calcium carbonate is surface-treated by using stearic acid and has a treatment level of 0.8 to 0.9 wt.-%, based on the total weight of the calcium carbonate.

Reference 2: calcium carbonate, commercially available from Omya, Switzerland, having a $d_{50}$ of 0.8 µm, a $d_{98}$ of 4 µm and a BET specific surface area of 11 m²/g. The particles have a Cielab a* of −0.2, a Cielab b* of 0.5 and a Cielab L* of 97.5. The calcium carbonate is surface-treated by using stearic acid and has a treatment level of 1.0 wt.-%, based on the total weight of the calcium carbonate.

Reference 3: calcium carbonate, commercially available from Omya, Switzerland, having a $d_{50}$ of 0.8 µm, a $d_{98}$ of 4 µm and a BET specific surface area of 11 m²/g. The calcium carbonate is surface-treated by using stearic acid and has a treatment level of 2.0 wt.-%, based on the total weight of the calcium carbonate.

The components for the inventive as well as comparative examples were previously mixed using the usual hot/cold mixing process known to the skilled person, and extruded on a Gottfert extrusion line equipped with a Krauss-Maffei plastifiction unit, L/D 32, with counter rotating parallel twin screws, the screws having a diameter of 30 mm each.

Figure 2:
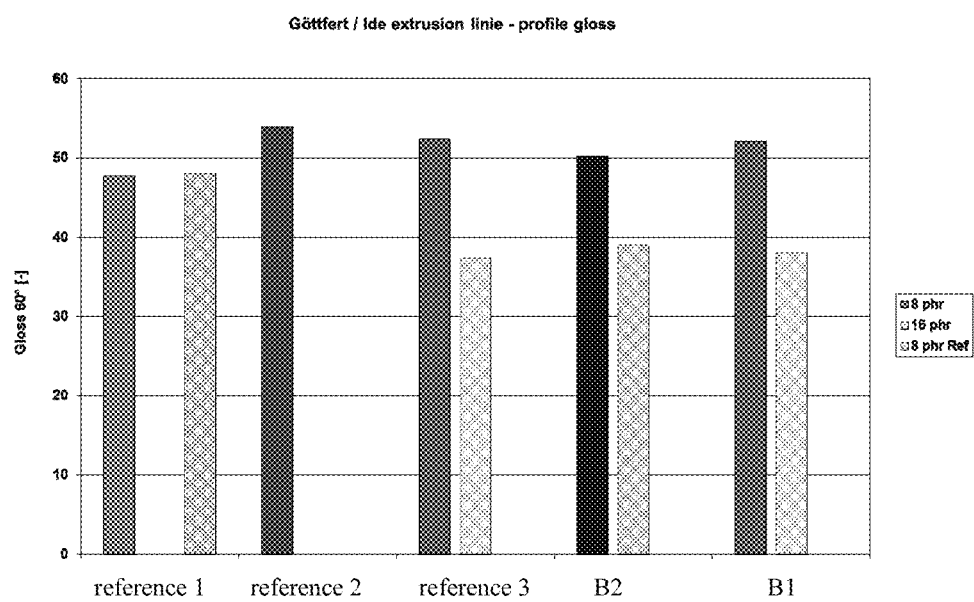
FIG. 2: Plot showing prepared extruded profiles tested with regard to gloss 60°[-].

The prepared extruded profiles were tested with regard to the charpy impact resistance (ISO 179/1fC) and gloss 60° [–]. The results can be gathered from FIGS. 1 and 2. As can be gathered from FIGS. 1 and 2, the inventive sample B1 and B2 provides for an increase in charpy impact resistance (ISO 179/1fC) with same amount (16 phr) of crumbles of the present invention in comparison to the references 1 to 3. Gloss 60° [–] of the inventive samples B1 and B2 is not affected to the negative and remains within the tolerances, see FIG. 2. Further optical properties as described in Table 5 below such as brightness—see L*-value, are also not affected to the negative and red-/yellowness-values—see a*/b*-values, remain within the tolerances and thus the overall benefit provided by the present invention is shown.

TABLE 5 optical properties of extruded profiles

| Samples | CIELAB L* (brightness) | CIELAB a* (green-red) | CIELAB b* (blue-yellow) |
| --- | --- | --- | --- |
| Reference 1 - 8 phr | 95.7 | −0.33 | 3.56 |
| Reference 2 - 8 phr | 96.2 | −0.47 | 3.57 |
| Reference 3 - 8 phr | 96.0 | −0.43 | 3.64 |
| Reference 3 - 16 phr | 95.9 | −0.46 | 3.73 |
| B2 - 8 phr | 96.0 | −0.48 | 3.55 |
| B1 - 8 phr | 96.2 | −0.47 | 3.52 |
| B2 - 16 phr | 95.9 | −0.46 | 3.73 |
| B1 - 16 phr | 95.9 | −0.45 | 3.73 |

B) Application in PE

The crumbles C1 and C2 were tested in PE extrusion.

The crumbles C1 and C2 of the present invention were made into a master batch of a linear low density polyethylene (LLDPE; MFI=1 g/10 min, ExxonMobil 1001) as outlined in table 6 below.

A filter pressure test was performed in order to determine the filter pressure value FPV of such LLDPE master batch and compared to the FPV a master batch comprising a calcium carbonate of the prior art. The results are given in Table 6 below.

TABLE 6 composition of the master batch and FPV

| | Crumbles C1 | Crumbles C2 | Reference 4 |
| --- | --- | --- | --- |
| Amount of crumbles [wt.-%] | 65 | 65 | 65 |
| Amount of LLDPE Exxon Mobil 1001 [wt.-%] | 35 | 35 | 35 |
| Filter pressure at 14 μm pore size [bar/g] | 1.3 | 1.7 | 1.6 |

The reference material is as follows:

Reference 4: calcium carbonate, commercially available from Omya, Switzerland, having a $d_{50}$ of 1.7 μm, a $d_{98}$ of 8 μm and a BET specific surface area of 4 to 5 m²/g. The particles have a Cielab a* of 0.1, a Cielab b* of 1.1 and a Cielab L* of 98.5. The calcium carbonate is surface-treated by using stearic acid and has a treatment level of 0.7 to 0.8 wt.-%, based on the total weight of the calcium carbonate.

The crumbles of the present invention clearly show their beneficial properties over reference 4 when made into a master batch. The pressure on the pore filter at 14 μm shows that the crumbles C1 of to the present invention, shows reduced pressure build up at the pore size filter, thus demonstrating the advantageous properties, the improved dispersion of the crumble particles in the polymer matrix.

Further to this, said filled LLDPE master batches were made into blown film by means known to the skilled person. Samples of the said blown films comprising the crumbles C1 and C2 of the present invention and samples of blown films comprising the reference 4 are compared hereafter in table 7. Different amounts of filled master batch were mixed with a further LLDPE (Dowlex 5056G; C8-LLDPE, MFI=1 g/10 min,) and blown films were made from these mixtures on a Dr. Collin film line. The content of the crumbles C1 and C2 and of the reference 4 in the final films were 20 wt.-%, based on the total weight of the respective final film. Films having a width of 22 cm, a film grammage of 35 g/m² and a frost line position at 15 cm were prepared.

The mechanical properties of the prepared films are outlined in table 7 below.

TABLE 7 mechanical properties of prepared films

| Formulation | 1 | 2 | 3 |
| --- | --- | --- | --- |
| CaCO$_3$ | C1 | C2 | Reference 4 |
| Universal tests | | | |
| Yield, MD[1] [N/mm²] | 9.6 | 9.8 | 9.8 |
| Yield, CD[2] [N/mm²] | 9.8 | 10.0 | 9.9 |
| Elongation at break, MD[1] [%] | 536 | 541 | 505 |
| Elongation at break, CD[2] [%] | 572 | 574 | 540 |
| Force at break, MD[1] [N/mm²] | 36.7 | 38.5 | 31.2 |
| Force at break, CD[2] [N/mm²] | 33.1 | 33.3 | 28.5 |
| E-modulus, MD[1] [N/mm²] | 283 | 291 | 301 |
| E-modulus, CD[2] [N/mm²] | 312 | 318 | 321 |

[1]MD refers to machine direction,
[2]CD refers to cross direction.

As can be seen from table 7, the inventive crumbles C1 and C2 gave better force at break as well as dart drop resistance compared to the reference 4.

The invention claimed is:

1. Crumbles comprising at least one calcium carbonate-containing material, the crumbles:
   a) having solids content of 78.0 wt-% to 90.0 wt-%, based on a total weight of the crumbles,
   b) comprising particles of the at least one calcium carbonate-containing material having a:
      i) weight particle size $d_{75}$ of 0.7 to 3.0 μm,
      ii) weight median particle size $d_{50}$ of 0.5 to 2.0 μm,
      iii) weight particle size $d_{25}$ of 0.1 to 1.0 μm, as measured according to a sedimentation method, and
   c) comprising particles of the at least one calcium carbonate-containing material having a BET specific surface area of from 4.0 to 12.0 m²/g, measured by nitrogen gas adsorption using a BET isotherm (ISO 9277:2010).

2. The crumbles according to claim 1, wherein the at least one calcium carbonate-containing material is at least one natural calcium carbonate-containing material.

3. The crumbles according to claim 1, wherein the at least one calcium carbonate-containing material comprises dolomite and/or at least one ground calcium carbonate (GCC).

4. The crumbles according to claim 1, wherein the at least one calcium carbonate-containing material is at least one ground calcium carbonate (GCC) selected from the group consisting of marble, chalk, limestone, and any mixture thereof.

5. The crumbles according to claim 1, wherein the crumbles comprise at least one further particulate filler material.

6. The crumbles according to claim 1, wherein the crumbles comprise at least one further particulate filler material selected from the group consisting of precipitated calcium carbonate (PCC), a metal oxide, titanium dioxide, aluminium trioxide, a metal hydroxide, aluminium tri-hydroxide, a metal salt, a sulfate, a silicate, talc, kaolin, kaolin clay, mica, a carbonate, magnesium carbonate, gypsum, satin white, and any mixture thereof.

7. The crumbles according to claim 1, wherein the crumbles comprise on at least a part of an accessible surface area of the calcium carbonate-containing material particles a treatment layer comprising a hydrophobizing agent.

8. The crumbles according to claim 1, wherein the crumbles comprise on at least a part of an accessible surface area of the calcium carbonate-containing material particles a treatment layer comprising an aliphatic carboxylic acid having a total amount of carbon atoms from C4 to C24 and/or reaction products thereof and/or at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof and/or a phosphoric acid ester blend of one or more phosphoric acid mono-ester and/or reaction products thereof and one or more phosphoric acid di-ester and/or reaction products thereof.

9. The crumbles according to claim 1, wherein the crumbles have:
    a) a moisture pick up susceptibility such that its total surface moisture level is <0.6 mg/g of dry crumbles after exposure to an atmosphere of 50% of relative humidity for 48 hours at a temperature of 23° C., and/or
    b) a moisture content of from 0.2 wt-% to 0.6 wt-% based on a total dry weight of the crumbles.

10. The crumbles according to claim 1, wherein the crumbles have:
    a) a moisture pick up susceptibility such that its total surface moisture level is <0.5 mg/g of dry crumbles after exposure to an atmosphere of 50% of relative humidity for 48 hours at a temperature of 23° C., and/or
    b) a moisture content of from 0.2 wt-% to 0.4 wt-% based on a total dry weight of the crumbles.

11. The crumbles according to claim 1, wherein the crumbles have:
    a) a moisture pick up susceptibility such that its total surface moisture level is <0.4 mg/g of dry crumbles after exposure to an atmosphere of 50% of relative humidity for 48 hours at a temperature of 23° C., and/or
    b) a moisture content of from 0.25 wt-% to 0.35 wt-% based on a total dry weight of the crumbles.

12. The crumbles according to claim 1, wherein the crumbles have a moisture pick up susceptibility such that its total surface moisture level is ≤0.3 mg/g of dry crumbles after exposure to an atmosphere of 50% of relative humidity for 48 hours at a temperature of 23° C.

13. A process for the preparation of crumbles comprising at least one calcium carbonate-containing material, the process comprising the steps of:
    a) providing at least one calcium carbonate-containing material in the form of an aqueous slurry having solids content in the range from 5.0 to 45.0 wt-%, based on the total weight of the slurry,
    b) wet grinding the at least one calcium carbonate-containing material of step a) to obtain an aqueous slurry of an at least one wet-ground calcium carbonate-containing material, wherein the particles of the at least one wet-ground calcium carbonate-containing material have a:
        i) weight particle size $d_{75}$ of 0.7 to 3.0 μm,
        ii) weight median particle size $d_{50}$ of 0.5 to 2.0 μm,
        iii) weight particle size $d_{25}$ of 0.1 to 1.0 μm, as measured according to a sedimentation method, and
        iv) a BET specific surface area of from 4.0 to 12.0 m$^2$/g, measured by nitrogen gas adsorption using a BET isotherm (ISO 9277:2010), and
    c) mechanically dewatering the aqueous slurry of step b) to obtain crumbles comprising the at least one calcium carbonate-containing material having a solids content of 78.0 wt-% to 90.0 wt-%, based on a total weight of the crumbles.

14. The process according to claim 13, wherein the at least one calcium carbonate-containing material in step a) is at least one ground calcium carbonate (GCC) selected from the group consisting of marble, chalk, limestone, and any mixture thereof.

15. The process according to claim 13, wherein the aqueous slurry of the at least one calcium carbonate-containing material of step a) is free of dispersing agents and/or wet-grinding step b) and/or mechanically dewatering step c) is/are carried out in the absence of dispersing agents.

16. The process according to claim 13, wherein the aqueous slurry of the at least one wet-ground calcium carbonate-containing material obtained in step b) has a:
    a) lower solids content than that of the aqueous slurry of the at least one calcium carbonate-containing material provided in step a), or
    b) solids content in the range from 10.0 wt-% to 35.0 wt-%, based on the total weight of the slurry.

17. The process according to claim 13, wherein step b) is carried out in the presence of at least one further particulate filler material.

18. The process according to claim 13, wherein step b) is carried out in the presence of at least one further particulate filler material selected from the group consisting of precipitated calcium carbonate (PCC), a metal oxide, titanium dioxide, aluminium trioxide, a metal hydroxide, aluminium tri-hydroxide, a metal salt, a sulfate, a silicate, talc, kaolin, kaolin clay, mica, a carbonate, magnesium carbonate, gypsum, satin white, and any mixture thereof.

19. The process according to claim 13, wherein the aqueous slurry of the at least one wet-ground calcium carbonate-containing material obtained in step b) is partially dewatered to a solids content in the range from 20.0 wt-% to 40.0 wt-%, based on a total weight of the slurry, before process step c) is carried out.

20. The process according to claim 13, wherein process step c) is carried out under pressure from 20.0 bar to 140.0 bar.

21. The process according to claim 13, wherein process step c) is carried out under pressure from 65.0 bar to 120.0 bar.

22. The process according to claim 13, wherein process step c) is carried out under pressure from 80.0 to 110.0 bar.

23. The process according to claim 13, wherein step c) is carried out in a vertical plate pressure filter, a tube press or a vacuum filter.

24. The process according to claim 13, wherein step c) is carried out in a tube press.

25. The process according to claim 13, wherein the process further comprises the following step(s):
   d) treating the crumbles comprising the at least one calcium carbonate-containing material obtained in step c) with a hydrophobizing agent to obtain surface-treated crumbles comprising on at least a part of an accessible surface area of the calcium carbonate-containing material particles a treatment layer comprising the hydrophobizing agent, and/or
   e) drying the crumbles comprising the at least one calcium carbonate-containing material obtained in step c) to solids content of ≥97.0 wt-%, based on the total weight of the crumbles, and/or
   f) dispersing the crumbles with a polyacrylate-based dispersant.

26. The process according to claim 25, wherein the hydrophobizing agent in step d) is an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric acid di-ester.

27. The process according to claim 25, wherein the crumbles in step e) are dried to solids content of from 97.0 wt-% to 99.8 wt-%, based on the total weight of the crumbles.

28. An article comprising the crumbles according to claim 1.

29. The article of claim 28, wherein the article is selected from the group consisting of a plastic, a film, a blown film, a breathable film, a fibre, polyvinyl chloride, a plastisol, a thermosetting polymer, a thermosetting unsaturated polyester, a thermosetting unsaturated polyurethane, an agricultural product, food, a cosmetic, a sealant, a pharmaceutical, paper, a paper coating, a coating, paint, and an adhesive.

* * * * *